(12) United States Patent
Honda et al.

(10) Patent No.: US 7,612,706 B2
(45) Date of Patent: Nov. 3, 2009

(54) MONOPULSE RADAR APPARATUS AND ANTENNA SWITCH

(75) Inventors: Kanako Honda, Hyogo (JP); Kenji Oka, Hyogo (JP); Kimihisa Yoneda, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 221 days.

(21) Appl. No.: 11/630,040

(22) PCT Filed: Jul. 15, 2005

(86) PCT No.: PCT/JP2005/013183

§ 371 (c)(1),
(2), (4) Date: Dec. 19, 2006

(87) PCT Pub. No.: WO2006/000001

PCT Pub. Date: Jan. 5, 2006

(65) Prior Publication Data

US 2007/0182619 A1 Aug. 9, 2007

(30) Foreign Application Priority Data

Jul. 16, 2004 (JP) ............................. 2004-210440
Aug. 4, 2004 (JP) ............................. 2004-228323

(51) Int. Cl.
*G01S 13/00* (2006.01)
(52) U.S. Cl. .................. 342/80; 342/107; 342/140; 342/149; 342/91; 342/92
(58) Field of Classification Search ................. 342/149
See application file for complete search history.

(56) References Cited

U.S. PATENT DOCUMENTS

| | | | |
|---|---|---|---|
| 5,815,112 A | 9/1998 | Sasaki et al. | |
| 5,955,991 A * | 9/1999 | Kawakubo | 342/374 |
| 6,085,151 A | 7/2000 | Farmer et al. | |
| 6,218,987 B1 * | 4/2001 | Derneryd et al. | 342/373 |
| 6,697,344 B1 | 2/2004 | Carrozza et al. | |
| 6,859,168 B2 * | 2/2005 | Isaji | 342/128 |
| 6,989,782 B2 * | 1/2006 | Walker et al. | 342/134 |
| 7,173,561 B2 * | 2/2007 | Isaji | 342/70 |
| 2006/0287828 A1 * | 12/2006 | Lehner | 701/301 |

FOREIGN PATENT DOCUMENTS

| | | |
|---|---|---|
| JP | A 5-87914 | 4/1993 |
| JP | A 5-100016 | 4/1993 |
| JP | A 7-20235 | 1/1995 |
| JP | A 7-321536 | 12/1995 |
| JP | A 8-334557 | 12/1996 |

(Continued)

*Primary Examiner*—Thomas H Tarcza
*Assistant Examiner*—Timothy A Brainard
(74) *Attorney, Agent, or Firm*—Oliff & Berridge, PLC

(57) ABSTRACT

An antenna unit includes at least one transmission antenna and plural reception antennas. A receiver detects information including azimuth information for a target, based on an output from the antenna unit. An antenna switching unit switches connections between a transmitter and the transmission antenna and between the reception antenna and the receiver. The antenna unit includes a wide-beam array antenna and plural narrow-beam array antennas having a narrower beam width than the array antenna. A monopulse process is performed based on an output of a predetermined pair of array antennas from among the array antennas formed as the narrow-beam array antennas.

36 Claims, 16 Drawing Sheets

FOREIGN PATENT DOCUMENTS

| | | |
|---|---|---|
| JP | A 9-159751 | 6/1997 |
| JP | A 9-162626 | 6/1997 |
| JP | A 10-325863 | 12/1998 |
| JP | A 11-64485 | 3/1999 |
| JP | A 11-133143 | 5/1999 |
| JP | A 11-271435 | 10/1999 |
| JP | A 11-281729 | 10/1999 |
| JP | A 11-287854 | 10/1999 |
| JP | A 2000-90307 | 3/2000 |
| JP | A 2000-230974 | 8/2000 |
| JP | A 2000-258524 | 9/2000 |
| JP | A 2000-312173 | 11/2000 |
| JP | A 2001-289941 | 10/2001 |
| JP | A 2002-511922 | 4/2002 |
| JP | A 2003-248055 | 9/2003 |
| JP | A 2006-3097 | 1/2006 |

* cited by examiner $$\phi = \frac{2\pi}{\lambda} d_0 \sin\theta$$

OUTPUT END OF ARRAY ANTENNA F

OUTPUT END OF ARRAY ANTENNA E

OUTPUT END OF ARRAY ANTENNA D

F  E  D

F  E  D

MONOPULSE RADAR APPARATUS AND ANTENNA SWITCH

TECHNICAL FIELD

The present invention relates to a monopulse radar apparatus, and, more particularly to a monopulse radar apparatus having antenna elements effectively disposed in a limited space, and an antenna switch that selectively connects plural antennas of a monopulse radar apparatus to a transmitter and a receiver.

BACKGROUND ART

As a radar apparatus that detects azimuth information of a target object in addition to the information of a distance and a speed of the target object, there are disclosed examples of a scan radar apparatus that rotates a radar sensor with a turntable, and detects an angle of arrival of the target object by detecting an angle of the turntable (For example, Patent Document 1).

As a non-mechanical radar apparatus according to a conventional technique, there are disclosed examples of a monopulse radar apparatus that detects an angle of arrival by using a phase-comparison monopulse system. Among the monopulse radar apparatuses, there is a monopulse radar apparatus that detects a target in a wide range and identifies plural targets by utilizing an amplitude change of a reception signal generated by the switching of transmission beams using plural transmission antennas (For example, Patent Document 2).

To secure easiness of size reduction and mass production of antenna units, there is also a monopulse radar apparatus that includes antenna elements disposed in a matrix shape, series power feed lines provided in each row of these antenna elements, and parallel power feed lines that perform parallel power supply in each row of the antenna elements via the series power feed lines (For example, Patent Document 3). According to the monopulse radar apparatus disclosed in the Patent Document 3, array antennas are disposed on the same plane so that all rows or a part of rows within the antenna elements formed in the series power feed lines cross each other at approximately an equal distance, in the two systems of array antennas formed in this way.

Further, there is also a radar apparatus that discloses a technique of preventing an erroneous detection of an azimuth of a target when the target is present in the azimuth in which a phase return occurs (For example, Patent Document 4). A radar apparatus disclosed in the Patent Document 4 compares a first forecast azimuth as a target azimuth calculated from a phase difference of signals received by element antennas disposed at a distance d1 among plural element antennas with a second forecast azimuth as a target azimuth calculated from a phase difference of signals received by element antennas disposed at a distance d2 different from the distance d1. When both forecast azimuths coincide with each other, the radar apparatus employs this azimuth as a detected azimuth.

Patent Document 1: Japanese Patent Application Laid-open No. H10-325863

Patent Document 2: Japanese Patent Application Laid-open No. H11-281729

Patent Document 3: Japanese Patent Application Laid-open No. H9-162626

Patent Document 4: Japanese Patent Application Laid-open No. 2000-230974

DISCLOSURE OF INVENTION

Problem to be Solved by the Invention

However, the scan radar apparatus disclosed in the Patent Document 1 requires an accurate alignment in the installation of the turntable on which the radar sensor is mounted. Furthermore, this scan radar apparatus has a disadvantage such as to require a structure of avoiding the influence of vibration of an installed platform. Further, when there is a limit to the space of the platform, a radar sensor and a turntable cannot be mounted, and the system cannot be achieved.

The monopulse radar apparatus disclosed in the Patent Document 2 achieves a phase-comparison monopulse process by switching transmission beams using plural transmission antennas. However, this monopulse radar apparatus requires a large space to mount the transmission antennas. When there is a limit to the space of the platform on which the transmission antennas are mounted, the system cannot be achieved, as the scan radar described in the Patent Document 1.

The monopulse radar apparatus shown in the Patent Document 3 discloses a configuration of reception antennas to perform a monopulse process, and does not disclose any effective configuration of the antenna unit including the transmission antennas. Similarly, the radar apparatus shown in the Patent Document 4 discloses a configuration that distances of elements of a pair of reception antenna are differentiated to perform a monopulse process, and the Patent Document 4 does not disclose any configuration of the antenna unit including the transmission antenna.

On one hand, the radar apparatus cannot obtain information of a distance, a speed, and an azimuth of a target object, unless an electric wave is irradiated to the target object. On the other hand, recent radar apparatuses are required to achieve high performance of detection capacity, a wide azimuth detection area, a short processing time, and a reduction of an erroneous detection in areas outside the azimuth detection area, in addition to the limit of the installation platform. In relation to these requirements, it is an important issue as to how to configure the antenna system including the transmission antenna.

For example, when the beam width of the transmission antenna is expanded, an erroneous detection increases in areas outside the azimuth detection area. When the beam width of the transmission antenna is narrowed, the number of an erroneous detection decreases, and it becomes necessary to scan the transmission beam in areas outside the azimuth detection area, resulting in the increase in the processing time. In the process of scanning the transmission beam in areas outside the azimuth detection area, it becomes meaningless to differentiate the distances between the elements of a pair of reception antennas disclosed in the Patent Document 4.

The present invention has been achieved in view of the above problems, and an object of the present invention is to provide a monopulse radar apparatus capable of performing a monopulse process in a wide range while limiting constraints of installation on a transmission/reception antenna system including a transmission antenna, and to provide an antenna switch that configures a part of the monopulse radar apparatus. Particularly, the invention has an object of providing a monopulse radar apparatus that configures a transmission/reception antenna system of a simple mechanism by effectively forming the transmission/reception antenna system in a limited space, and providing an antenna switch that configures a part of the monopulse radar apparatus.

Means for Solving Problem

To solve the above problems, and to achieve the object, a monopulse radar apparatus according to claim 1 of the present invention includes a transmitter that generates a transmission signal to detect a target, and outputs generated transmission signal; an antenna unit including at least one transmission antenna, and a plurality of reception antennas; a receiver that detects predetermined information including azimuth information for the target, based on an output from the antenna unit; and an antenna switching unit that switches a connection between the transmitter and the transmission antenna and a connection between the reception antenna and the receiver. The antenna unit includes an array antenna (a wide-beam array antenna) formed by a part of antenna elements that are constituent elements of the antenna unit; and a plurality of narrow-beam array antennas formed as array antennas having a narrower beam width than the array antenna. A monopulse process is performed based on an output of a predetermined pair of array antennas from among the array antennas formed as the narrow-beam array antennas.

According to, the present invention, in an antenna unit, an array antenna is configured using a part of antenna elements as constituent elements of the antenna unit. Plural array antennas having a narrower beam width than the beam width of this array antenna are also configured. In other words, a wide-beam array antenna and plural narrow-beam antennas are configured. In the array antenna configured in this way, a monopulse process is performed based on the output of a predetermined pair of array antennas among plural narrow-beam array antennas.

In the monopulse radar apparatus according to claim 2 of the present invention, the wide-beam array antenna functions as the transmission antenna.

In the monopulse radar apparatus according to claim 3 of the present invention, the wide-beam array antenna functions as the reception antenna.

In the monopulse radar apparatus according to claim 4 of the present invention, a main-beam direction of each of the array antennas constituting the predetermined pair of array antennas is deviated in either one of a lateral direction and a longitudinal direction from a center direction.

In the monopulse radar apparatus according to claim 5 of the present invention, when a layout surface of the antenna elements constituting the wide-beam array antenna is set as a reference layout surface, a layout surface of antenna elements constituting one of the predetermined pair of array antennas of which the main-beam direction is deviated in either one of a left direction and an up direction from the center direction is inclined in either one of the left direction and the up direction by a predetermined inclination angle from the reference layout surface, and a layout surface of antenna elements constituting other of the predetermined pair of array antennas of which the main-beam direction is deviated in either one of a right direction and a down direction from the center direction is inclined in either one of the right direction and the down direction by a predetermined inclination angle from the reference layout surface.

In the monopulse radar apparatus according to claim 6 of the present invention, the predetermined inclination angle of the one of the array antennas substantially coincides with a deviation angle of the main-beam direction of the one of the array antennas with reference to the main-beam direction of the wide-beam array antenna, and the predetermined inclination angle of the other of the array antennas substantially coincides with a deviation angle of the main-beam direction of the other of the array antennas with reference to the main-beam direction of the wide-beam array antenna.

In the monopulse radar apparatus according to claim 7 of the present invention, either one of the wide-beam array antenna and the predetermined pair of array antennas functions as the transmission antenna.

In the monopulse radar apparatus according to claim 8 of the present invention, either one of one of the predetermined pair of array antennas and the wide-beam array antenna functions as the transmission antenna, and the monopulse process is performed based on outputs of the one and the other of the predetermined pair of array antennas.

In the monopulse radar apparatus according to claim 9 of the present invention, a pair of array antennas formed by alternately connecting a predetermined number of antenna element groups obtained by connecting a row in a longitudinal direction in a part of the antenna elements of the antenna unit is configured as the narrow-beam array antennas.

A monopulse radar apparatus according to claim 10 of the present invention includes a transmitter that generates a transmission signal to detect a target, and outputs generated transmission signal; an antenna unit including at least one transmission antenna, and a plurality of reception antennas; a receiver that detects predetermined information including azimuth information for the target, based on an output from the antenna unit; and an antenna switching unit that switches a connection between the transmitter and the transmission antenna and a connection between the reception antenna and the receiver. The antenna unit includes at least three array antennas formed by antenna elements that are constituent elements of the antenna unit. A monopulse process is processed based on outputs of at least three sets of a pair of array antennas with different distances between elements, obtained by combining two array antennas from among the at least three array antennas.

In the monopulse radar apparatus according to claim 11 of the present invention, any one of the at least three array antennas functions as the transmission antenna, and an antenna beam of an array antenna that functions as the transmission antenna has a wide angle during a signal transmission.

In the monopulse radar apparatus according to claim 12 of the present invention, an area of a target is specified based on a sign of a phase difference that is monopulse-processed based on the outputs of the at least three sets of the pair of array antennas.

In the monopulse radar apparatus according to claim 13 of the present invention, when the area of the target is not specified uniquely, the area is specified based on antenna patterns of the at least three sets of the pair of array antennas.

In the monopulse radar apparatus according to claim 14 of the present invention, a detection area is divided into a plurality of areas in which a phase distortion does not occur, and a main-beam direction of the pair of array antennas is deviated with respect to each of divided areas.

In the monopulse radar apparatus according to claim 15 of the present invention, when a layout surface of the antenna elements constituting the wide-beam array antenna is set as a reference layout surface, a layout surface of antenna elements constituting one of the at least three sets of the pair of array antennas of which the main-beam direction is deviated in either one of a left direction and an up direction from the center direction is inclined in either one of the left direction and the up direction by a predetermined inclination angle from the reference layout surface, and a layout surface of antenna elements constituting other of the at least three sets of the pair of array antennas of which the main-beam direction is deviated in either one of a right direction and a down direction from the center direction is inclined in either one of the right direction and the down direction by a predetermined inclination angle from the reference layout surface.

In the monopulse radar apparatus according to claim 16 of the present invention, the predetermined inclination angle of the one of the array antennas substantially coincides with a deviation angle of the main-beam direction of the one of the array antennas with reference to the main-beam direction of an array antenna that functions as the transmission antenna, and the predetermined inclination angle of the other of the array antennas substantially coincides with a deviation angle of the main-beam direction of the other of the array antennas with reference to the main-beam direction of the array antenna that functions as the transmission antenna.

A monopulse radar apparatus according to claim 17 of the present invention includes a transmitter that generates a transmission signal to detect a target, and outputs generated transmission signal; an antenna unit including at least one transmission antenna, and a plurality of reception antennas; a receiver that detects predetermined information including azimuth information for the target, based on an output from the antenna unit; and an antenna switching unit that switches a connection between the transmitter and the transmission antenna and a connection between the reception antenna and the receiver. The antenna unit includes at least three array antennas formed by antenna elements that are constituent elements of the antenna unit. An azimuth angle of the target is calculated for each phase difference detected based on outputs of at least two sets of a pair of array antennas having different distances between elements, obtained by combining two array antennas from among the at least three array antennas. Targets of a same speed and a same distance are selected from calculated azimuth angles.

In the monopulse radar apparatus according to claim 18 of the present invention, the antenna switching unit includes a first amplifier that amplifies a transmission signal from the transmitter, and supplies amplified transmission signal to one antenna; a second amplifier that amplifies a reception signal of the one antenna; a plurality of third amplifiers that amplify reception signals of other antennas, respectively; and a first switch that selects any one of an output of the second amplifier and outputs of the third amplifiers, and supplies selected output to the receiver.

The monopulse radar apparatus according to claim 19 of the present invention further includes a second switch that is provided between the output of the first amplifier and the one antenna; and a third switch that is provided between the one antenna and the second amplifier.

In the monopulse radar apparatus according to claim 20 of the present invention, turning on/off of the first amplifier is interlocked with turning on/off of the second switch, turning on/off of the second amplifier is interlocked with turning on/off of the third switch, and turning on of either one of the second amplifier and any one of the third amplifiers is interlocked with a selection of the first switch.

In the monopulse radar apparatus according to claim 21 of the present invention, the second amplifier and the plurality of third amplifiers can perform a gain adjustment independently, and gains of reception signals can be adjusted by the gain adjustment.

An antenna switch according to claim 22 of the present invention selectively connects a plurality of antennas to either one of a transmitter and a receiver. The antenna switch includes a first amplifier that amplifies a transmission signal from the transmitter, and supplies amplified transmission signal to one antenna; a second amplifier that amplifies a reception signal of the one antenna; a plurality of third amplifiers that amplify reception signals of other antennas, respectively; and a first switch that selects any one of an output of the second amplifier and outputs of the third amplifiers, and supplies selected output to the receiver.

The monopulse radar apparatus according to claim 23 of the present invention further includes a second switch that is provided between the output of the first amplifier and the one antenna; and a third switch that is provided between the one antenna and the second amplifier.

In the monopulse radar apparatus according to claim 24 of the present invention, turning on/off of the first amplifier is interlocked with turning on/off of the second switch, turning on/off of the second amplifier is interlocked with turning on/off of the third switch, and turning on of either one of the second amplifier and any one of the third amplifiers is interlocked with a selection of the first switch.

In the monopulse radar apparatus according to claim 25 of the present invention, the second amplifier and the plurality of third amplifiers can perform a gain adjustment independently, and gains of reception signals can be adjusted by the gain adjustment.

EFFECT OF THE INVENTION

A monopulse radar apparatus according to the present invention performs a monopulse process based on the output of a predetermined pair of array antennas among plural narrow-beam array antennas. Therefore, an antenna beam suitable for the monopulse process can be formed, without particularly changing a layout of antenna elements that constitute the array antennas, and without particularly combining beams.

Furthermore, according to the present invention, the monopulse radar apparatus performs a monopulse process based on outputs of a pair of array antennas of a predetermined number or a larger number of sets of array antennas having different distances between elements out of three or more array antennas configured by constituent elements of the antenna unit. Therefore, an antenna beam suitable for the monopulse process can be formed, without particularly changing a layout of antenna elements that constitute the array antennas, and without particularly combining beams.

According to an antenna switch of the present invention, a transmission signal amplified by a first amplifier is supplied to one antenna via a second switch, and a first switch selects any one of the output of a second amplifier that amplifies a reception signal of one antenna and the outputs of plural third amplifiers that amplify reception signals of other plural antennas, and supplies the selected output to a receiver. Therefore, the antenna switch that constitutes the radar apparatus can be made small and light.

BRIEF DESCRIPTION OF DRAWINGS

FIGS. 3-1 to FIG. 3-3 depict a principle of an azimuth detection of an amplitude-comparison monopulse system, where FIG. 3-1 depicts two antenna patterns having center azimuths of antenna beams shifted;

FIG. 3-2 depicts signal intensity of a sum signal (Σ) and a difference signal (Δ) that are generated based on the signals received by the antennas of the antenna pattern shown in FIG. 3-1;

FIG. 3-3 depicts an angle error signal that is generated based on the sum signal (Σ) and the difference signal (Δ) shown in FIG. 3-2;

FIG. 15-1 is a cross-sectional view of an approximate shape of an orthogonal cross-section that is orthogonal to both an antenna element layout surface and antenna element groups of the antenna unit shown in FIG. 8;

FIG. 15-2 is a cross-sectional view of an approximate shape of an orthogonal cross-section that is orthogonal to both an antenna element layout surface and antenna element groups of an antenna unit according to a fifth embodiment;

FIG. 16-1 is a cross-sectional view of an approximate shape of an orthogonal cross-section that is orthogonal to both the antenna element layout surface and the antenna element groups of the antenna unit shown in FIG. 4;

FIG. 16-2 is a cross-sectional view of an approximate shape of an orthogonal cross-section that is orthogonal to both an antenna element layout surface and antenna element groups of an antenna unit according to a sixth embodiment;

EXPLANATIONS OF LETTERS OR NUMERALS

Figure 1:
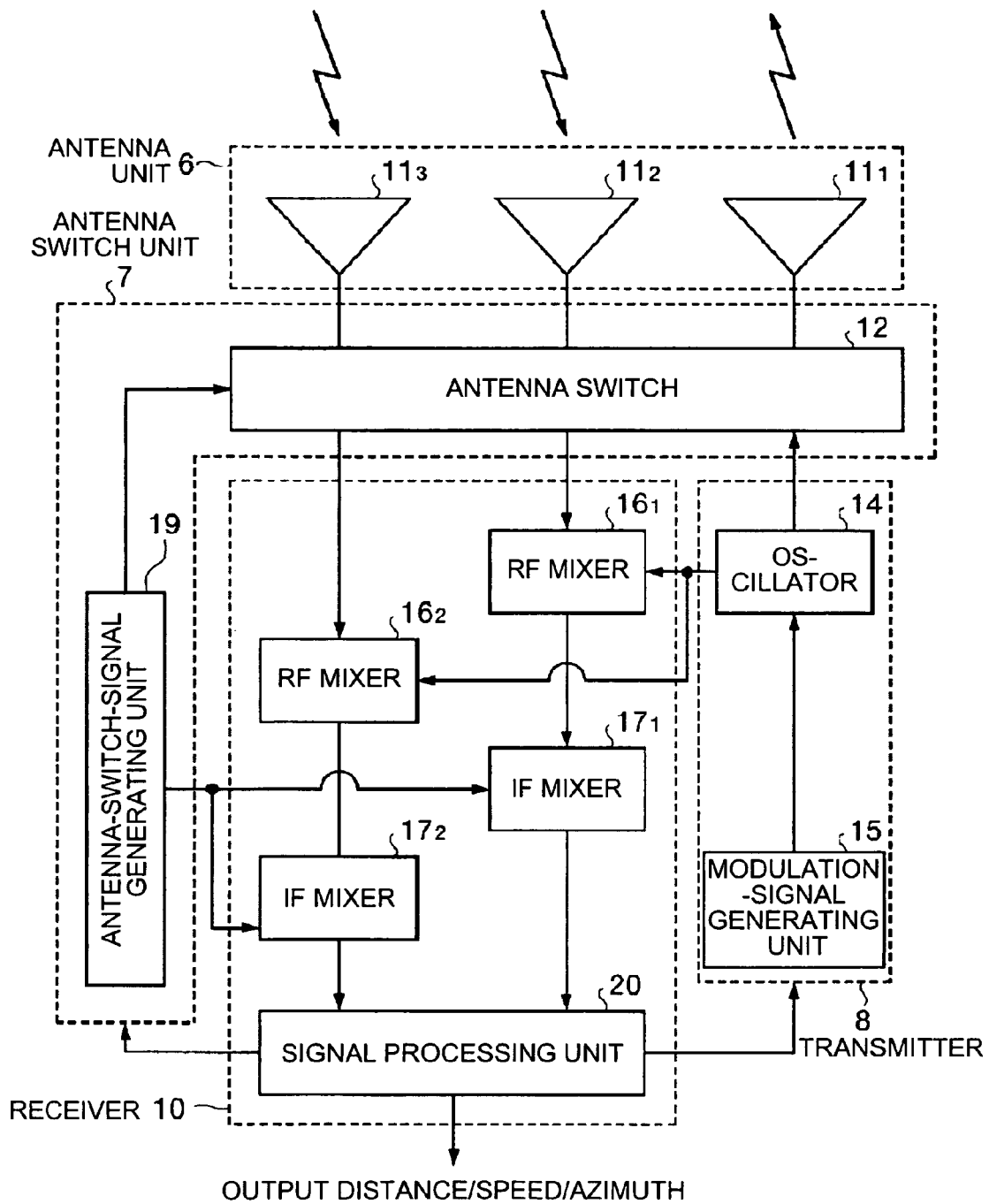
FIG. 1 is a block diagram of a configuration of a monopulse radar apparatus according to the present invention.

6 Antenna unit
7 Antenna switching unit
8 Transmitter
10 Receiver
$11_1$, $11_2$, $11_3$ Transmission/reception antenna
12 Antenna switch
14 Oscillator
15 Modulation-signal generating unit
$16_1$, $16_2$ RF mixer
$17_1$, $17_2$ IF mixer
19 Antenna-switch-signal generating unit
20 Signal processing unit
30 Switch mechanism

BEST MODE(S) FOR CARRYING OUT THE INVENTION

Exemplary embodiments of a monopulse radar apparatus according to the present invention will be explained below in detail with reference to the accompanying drawings. Note that the invention is not limited to the embodiments.

First Embodiment

FIG. 1 is a block diagram of a configuration of a monopulse radar apparatus according to the present invention. The radar apparatus shown in FIG. 1 is a configuration of a general monopulse radar apparatus. On the other hand, the monopulse radar apparatus according to the present invention has characteristics in the configuration of a transmission/reception antenna of the antenna unit, the configuration of an antenna switching unit, and the process of a signal processing unit performed based on these configurations. However, in explaining the present invention, the reader needs to understand the configuration of a general monopulse radar apparatus. Therefore, a configuration and the like of the monopulse radar apparatus to which the present invention is applied are explained first.

The monopulse radar apparatus shown in FIG. 1 includes processing units having processing functions divided in large blocks, that is, an antenna unit 6, an antenna switching unit 7, a transmitter 8, and a receiver 10. The antenna unit 6 includes transmission/reception antennas $11_1$, $11_2$, and $11_3$ that function as transmission antennas or reception antennas. The antenna switching unit 7 includes an antenna switch 12 that switches a connection of the transmission/reception antennas $11_1$, $11_2$, and $11_3$ to the transmitter 8 or to the receiver 10, and an antenna-switch-signal generating unit 19 that generates an antenna switch signal to switch the antenna switch 12. The transmitter 8 includes a modulation-signal generating unit 15 that generates various kinds of modulation signals (for example, an FM-CW modulation signal, and a pulse modulation signal) to generate a radar signal emitted from the antenna unit to the space, and an oscillator 14 that generates and outputs a radar signal modulated based on this modulation signal. The receiver 10 includes RF mixers 16 ($16_1$, $16_2$) that are connected to any one of the transmission/reception antennas $11_1$, $11_2$, and $11_3$, respectively, and downconverts reception signals output from the transmission/reception antennas $11_1$, $11_2$, and $11_3$, based on a mixer signal (an RF local signal) of an RF band supplied from the oscillator 14, IF mixers 17 ($17_1$, $17_2$) that are connected to the RF mixers 16, respectively, and downconvert a downconverted signal into a baseband signal, based on a mixer signal (an IF local signal) of an IF band supplied from the antenna-switch-signal generating unit 19, and a signal processing unit 20 that performs various kinds of signal processes based on signals output from the IF mixers 17, and generates and outputs information of a distance, a speed, and an azimuth. The signal processing unit 20 also has a function of a control unit that controls the transmitter 8 and the antenna switching unit 7.

Figure 2:
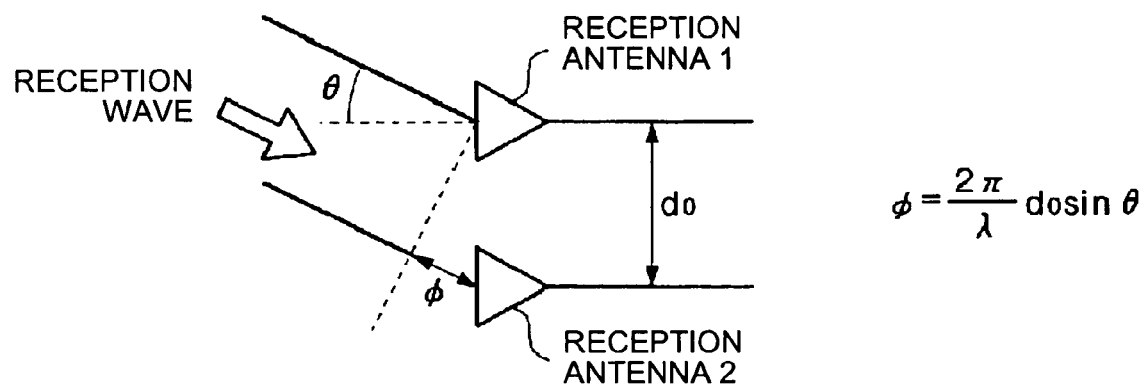
FIG. 2 depicts a principle of an azimuth detection of a phase-comparison monopulse system.

FIG. 2 depicts a principle of an azimuth detection of a phase-comparison monopulse system. In FIG. 2, when a reception wave is incident to a reception antenna 1 and a reception antenna 2, respectively at an angle of θ relative to a normal-line direction of an antenna surface of these antennas, respectively, a phase difference of $\phi=(2\pi/\lambda)\cdot d_0 \sin\theta$ occurs between the reception signal of the reception antenna 1 and the reception signal of the reception antenna 2. Therefore, according to the phase-comparison monopulse system, an angle of arrival θ of a reception wave determined by the expression of $\theta=\sin^{-1}(\phi\lambda/2\pi d_0)$ can be detected, by detecting this phase difference φ.

Figures 1, 3:
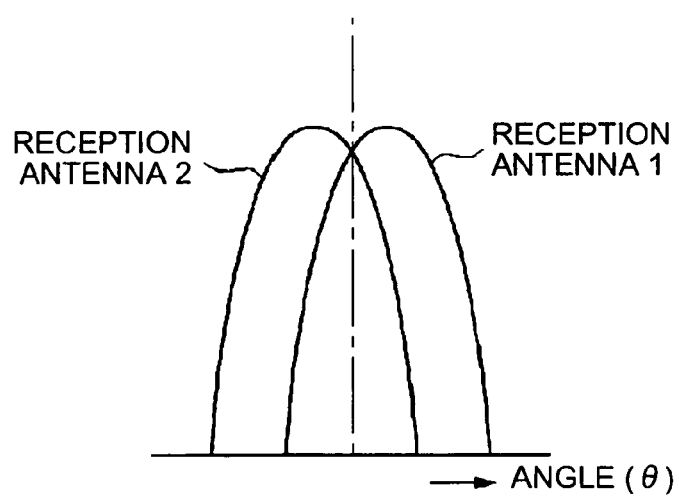
Figures 2, 3:
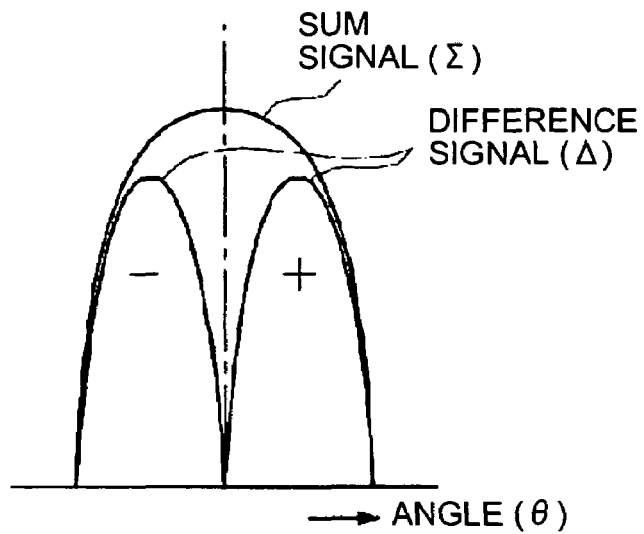
Figure 3:
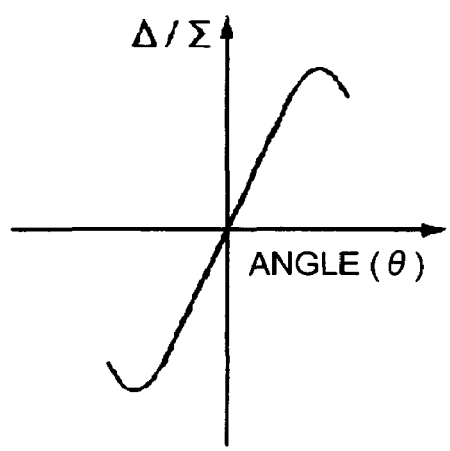

FIG. 3-1 to FIG. 3-3 depict a principle of an azimuth detection of an amplitude-comparison monopulse system. More specifically, FIG. 3-1 depicts two antenna patterns having center azimuths of antenna beams shifted. FIG. 3-2 depicts signal intensity of a sum signal (Σ) and a difference signal (Δ) that are generated based on the signals received by the antennas of the antenna pattern shown in FIG. 3-1. FIG. 3-3 depicts an angle error signal that is generated based on the sum signal (Σ) and the difference signal (Δ) shown in FIG. 3-2.

According to the amplitude-comparison monopulse system, the outputs of the two antennas, such as the reception antenna 1 and the reception antenna 2 having a part of their antenna patterns superimposed with each other shown in FIG. 3-1, are used to detect an angle error (a deviation from the antenna front surface direction). When a signal detected by the reception antenna 1 and a signal detected by the reception antenna 2 are added together, an output characteristic of the sum signal (Σ) as shown in FIG. 3-2 is obtained. On the other hand, when these detected signals are subtracted, an output characteristic of the difference signal (Δ) as shown in FIG. 3-2 is obtained. This difference signal (Δ) includes information of a deviation of a target antenna pattern, received by both reception antennas, from the center axis. However, when a target displacement is to be detected based on only this difference signal (Δ), the signal intensity changes depending on a size of the target and a difference from the target. Therefore, the angle cannot be measured correctly. To eliminate this variation, the difference signal (Δ) is divided by the sum signal (Σ) that receives an influence similar to that of the difference signal (Δ) (namely, normalized), thereby obtaining an angle error signal that does not receive the influence of this variation, as shown in FIG. 3-3. This angle error signal becomes approximately an S curve. When this angle error signal is used, a deviation from the direction of the front surface of the reception antenna, that is, the arrival angle θ of the reception wave can be detected.

As a configuration of the antenna unit that processes a monopulse signal using plural antennas in the monopulse radar apparatus, a configuration of a general plane antenna has a difficulty in that a pair of antennas that perform the monopulse process cannot be easily disposed at a desired distance (a distance in which a phase distortion does not occur). On the other hand, when the size of the antenna is made smaller, the distance between the pair of antennas can be made smaller. In this case, the antenna gain becomes small, and the antenna beams are widened, thereby affecting the detection performance. To solve this problem, the size of the antenna needs to be made smaller, and the antennas need to be arrayed. In arraying the antennas, the antennas need to be disposed to avoid a shift deviation, depending on a frequency band used.

Figure 4:
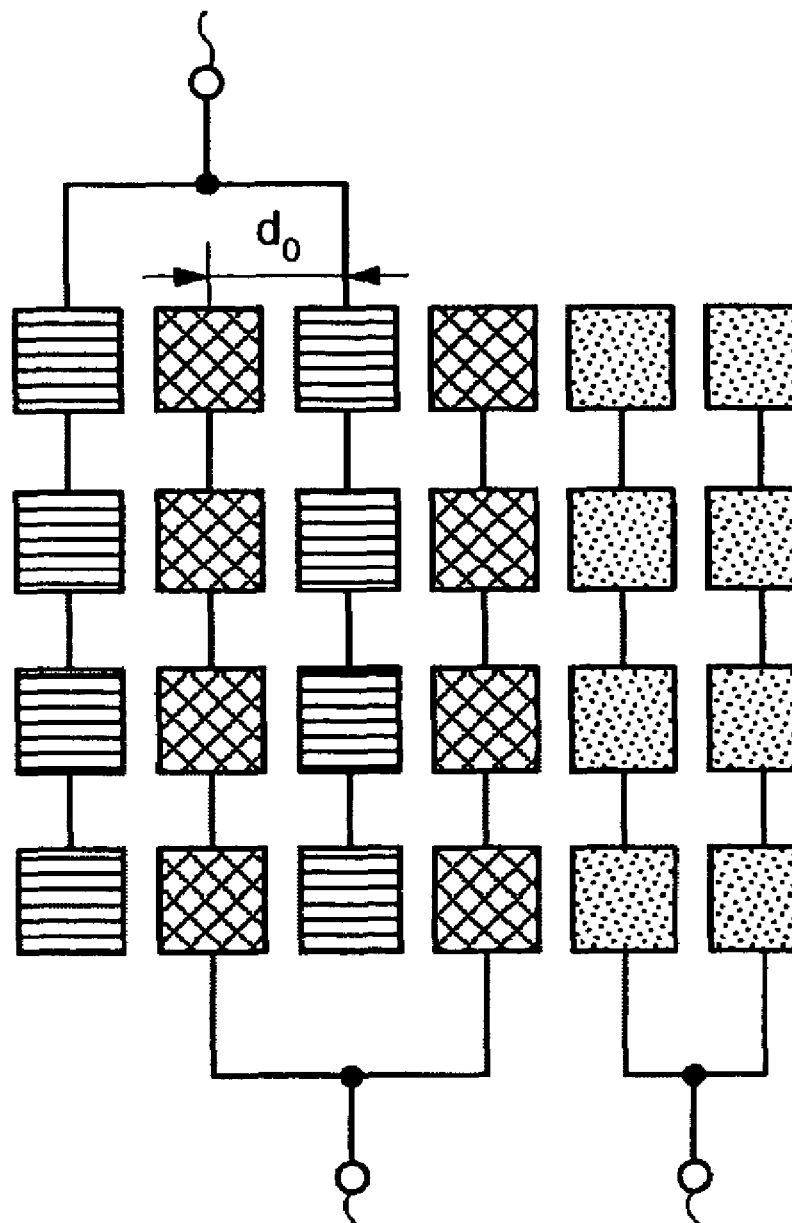
FIG. 4 depicts an antenna configuration of the antenna unit according to the first embodiment.

FIG. 4 depicts an antenna configuration of the antenna unit according to the first embodiment. As shown in FIG. 4, according to the array unit of this embodiment, four antenna elements are arrayed at equal distances in up and down (elevation) directions, and six antenna elements are arrayed at equal distances ($d_0$) in left and right (azimuth) directions, as a plane antenna. The antenna elements are also arrayed in the elevation direction to narrow the antenna beams in the elevation direction, thereby increasing the radiation efficiency in the front surface direction. While the radar processing technique according to the present invention can be also applied to both the elevation direction and the azimuth direction, there is no substantial difference of the application between both directions. Assuming the mounting of the monopulse radar apparatus according to the present embodiment to a vehicle, angle detection in the azimuth direction is explained below as an example.

In FIG. 4, the antenna unit according to the present embodiment has a configuration, in which four antenna elements in the elevation direction are set as one antenna group. Two antenna element groups are combined together to configure three array antennas of an array antenna A, an array antenna B, and an array antenna C. In the antenna configuration shown in FIG. 4, the array antenna A includes a first and a third antenna element groups from the left, respectively. The array antenna B includes a second and a fourth antenna element groups from the left, respectively. The array antenna C includes a fifth and a sixth antenna element groups from the left, respectively. In other words, a distance between the antenna element groups (or an antenna element group width), which constitute the array antenna C, is $d_0$. On the other hand, a distance between the antenna element groups (or an antenna element group width) that constitute the array antenna A and the array antenna B, respectively is $2d_0$, thereby having a double distance of the distance between the antenna element groups of the array antenna C. Therefore, when the same antenna elements are used, the beam width of the array antenna C is larger than the beam width of the array antenna A or the array antenna B.

According to the antenna unit of the present embodiment, a pair of comb-type array antennas are formed to have the antenna element groups of the array antenna A and the antenna element groups of the array antenna B that are disposed alternately, as shown in FIG. 4. In this case, a phase center of the array antenna A is near one antenna element group (the left antenna element group) of the array antenna B, and a phase center of the array antenna B is near one antenna element group (the right antenna element group) of the array antenna A. Therefore, the array antenna A and the array antenna B are set to have the same distance between the antennas as the antenna element distance $d_0$. Accordingly, when a distance between the antenna element groups that constitute each array antenna is set to a distance that does not generate a phase distortion, the array antenna C can be used as a transmission antenna, and the array antenna A and the array antenna B can be used as a pair of reception antennas that perform a monopulse signal process. With this arrangement, the phase distortion of the monopulse signal process described above can be suppressed.

Figure 5:
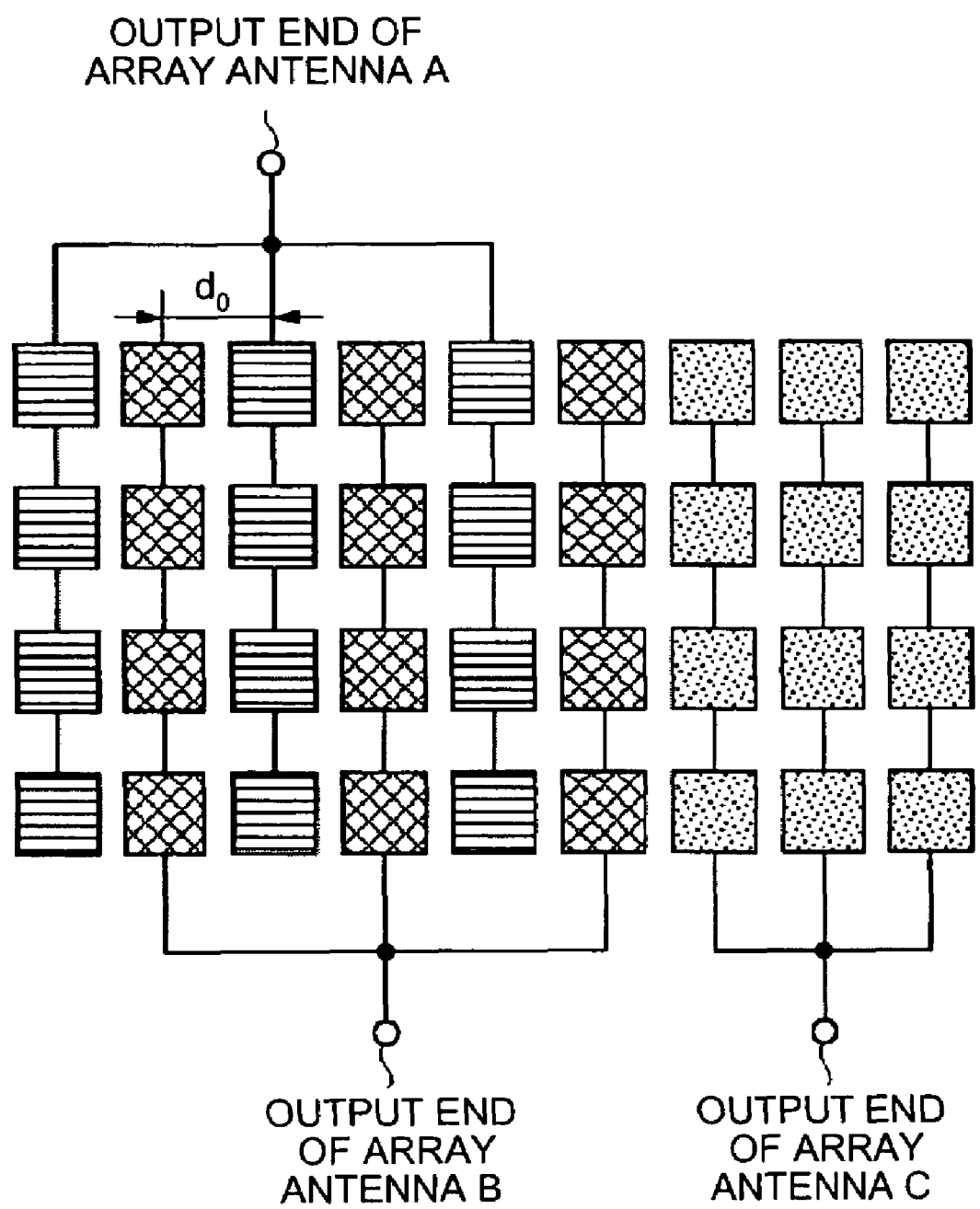
FIG. 5 depicts another antenna configuration of the antenna unit according to the first embodiment.

FIG. 5 depicts another antenna configuration different from the configuration of the antenna unit shown in FIG. 4 according to the first embodiment. In FIG. 5, the antenna unit 6 has a configuration, in which four antenna elements in the elevation direction are set as one antenna group. Three antenna element groups are combined together to form three array antennas of the array antenna A, the array antenna B, and the array antenna C. In the antenna configuration shown in FIG. 5, the array antenna A includes a first, a third, and a fifth antenna element groups from the left, respectively. The array antenna B includes a second, a fourth, and a sixth antenna element groups from the left, respectively. The array antenna C includes a seventh to a ninth antenna element groups from the left, respectively. In the antenna unit having the above configuration, a distance between the antenna element groups that constitute the array antenna C is $2d_0$. On the other hand, a distance between the antenna element groups that constitute the array antenna A and the array antenna B, respectively is $4d_0$, thereby having a double distance of the distance between the antenna element groups of the array antenna C. Therefore, these antenna element groups have a relationship similar to that of the antenna unit shown in FIG. 4.

In the antenna unit shown in FIG. 5, a phase center of the array antenna A and a phase of the array antenna B are set to the same distance as the antenna element distance $d_0$, like in the configuration of the antenna unit shown in FIG. 4. Therefore, when the array antenna A and the array antenna B are used as a pair of reception antennas that perform a monopulse signal process, the phase distortion of the monopulse signal process can be suppressed. As explained above, the antenna unit is configured to have a function equivalent to that of the antenna unit shown in FIG. 4.

Figure 6:
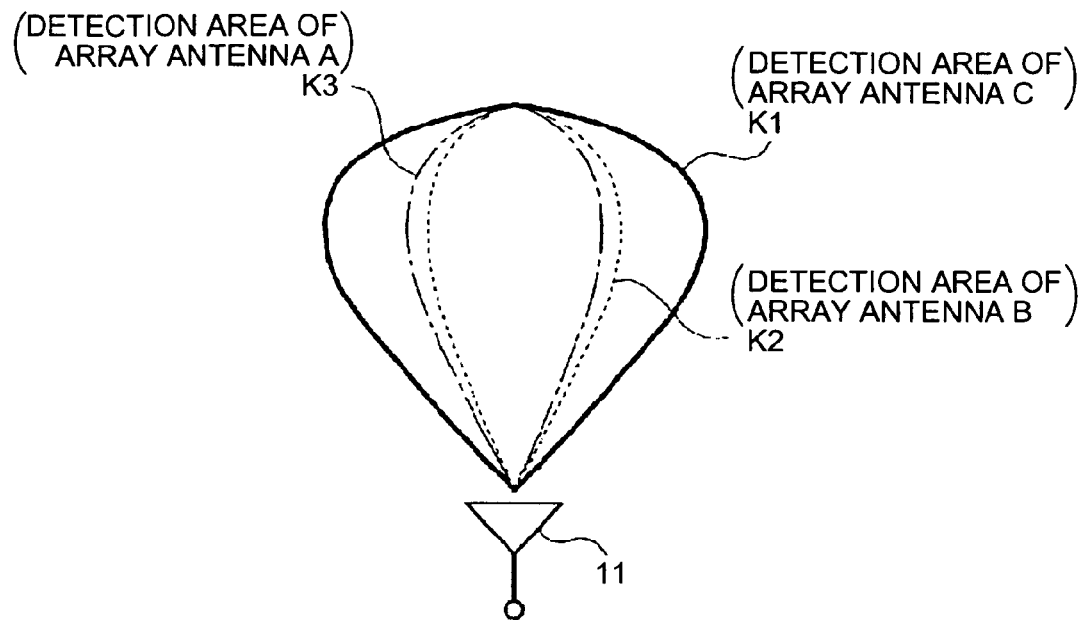
FIG. 6 depicts detection areas of the array antennas shown in FIG. 4.

FIG. 6 depicts detection areas of the array antennas shown in FIG. 4. As described above, the beam width of the array antenna C is larger than the beam width of the array antenna A or the array antenna B. Therefore, K1 that indicates the detection area of the array antenna C covers a larger range than K2 that indicates the detection area of the array antenna B or K3 that indicates the detection area of the array antenna A. In FIG. 6, the detection area of K2 is slightly shifted from the detection area K3 to facilitate the understanding of these areas, and these areas are substantially equal.

In the above configuration, assume that the array antenna C is a transmission antenna, and the array antenna A and the array antenna B are used to perform a monopulse process. In this case, an azimuth angle of a target that is present in the area of the array antenna A (and the array antenna B) can be detected. Consider that the array antenna C is also used as a reception antenna. In this case, when the array antenna C receives a certain target and when the array antenna A and the array antenna B cannot receive this target, it can be verified that this target is present in the area of the array antenna C, and that this target is not present in the area of the array antenna A (and the array antenna B). In other words, this target is not present near the center of these areas. When a target is close, the target can be received in a sidelobe, even when the target is not present in the range of a beam half-maximum full-width of the array antenna A or the array antenna B. However, in this case, it is also clear that the target is not present near the center, based on the fact that the array antenna C receives this target.

When a wide-range detection area is to be covered, this detection area is divided into plural areas in which a phase distortion does not easily occur. Any one of the above two processes is applied to each of the divided areas, while deviating the direction of a main beam of each antenna. With this arrangement, a correct azimuth without vagueness of angle can be detected. When the detection area is limited, angle precision of the detection azimuth within the detection area can be also improved.

In the present embodiment, the distance between the antenna element groups that constitute the array antenna A and the distance between the antenna element groups that constitute the array antenna B, respectively are set to two times of the distance between the antenna element groups that constitute the array antenna C. However, instead of setting the distance between the antenna element groups in this way, the width of the antenna element groups that constitute the array antenna A and the width of the antenna element groups that constitute the array antenna B, respectively can be also set to two times of the width of the antenna element groups that constitute the array antenna C, thereby obtaining a similar effect.

The distance or the width is not limited to the two times. What is important is that the beam pattern of the transmission antenna is formed larger than the beam pattern of the reception antenna, to satisfy the above process. In other words, it is sufficient to have a configuration including a transmission antenna having a wide beam pattern and a pair of reception antennas having a narrow beam pattern. Preferably, distances between the antenna element groups of the array antennas that constitute a pair of reception antennas are set the same, from the viewpoint of the same or equivalent beam patterns.

As explained above, according to the monopulse radar apparatus of the present embodiment, a wide-beam array antenna and plural narrow-beam antennas are configured. The monopulse radar apparatus performs a monopulse process based on the output of a pair of array antennas out of the plural narrow-beam array antennas, among the configured array antennas. Therefore, constraints of mounting on the antenna can be limited, and a wide-range monopulse process becomes possible. Further, the antenna elements can be effectively disposed on the limited space. Furthermore, the mechanism of the antenna unit becomes simple.

Second Embodiment

Figure 7:
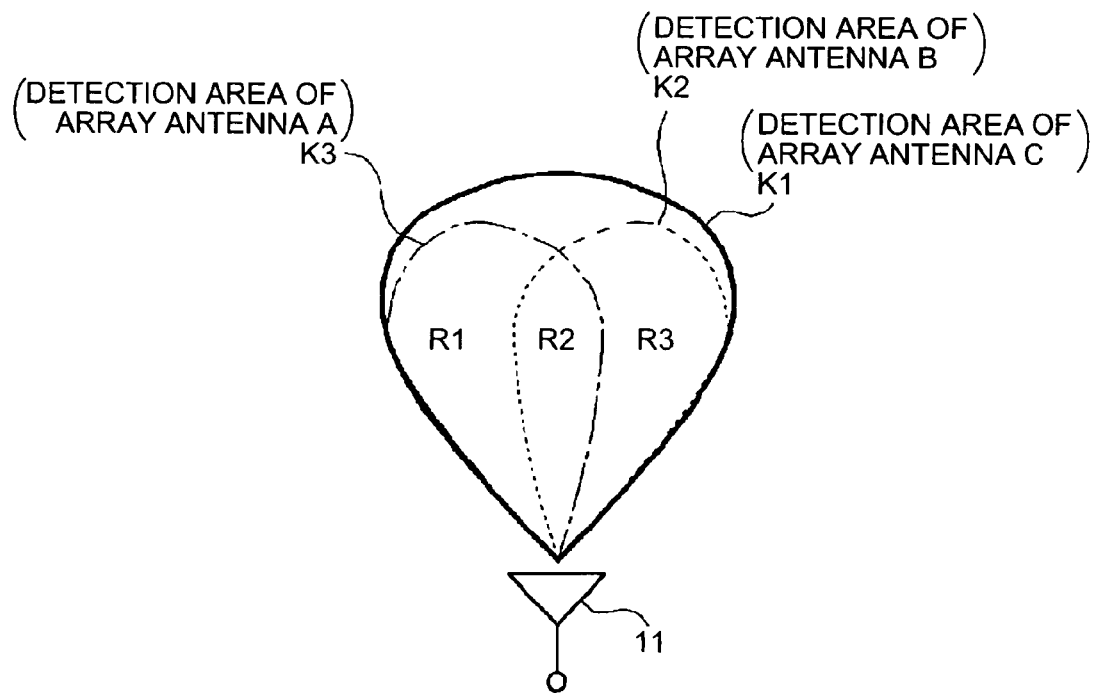
FIG. 7 depicts detection areas when the center directions of an array antenna A and an array antenna B shown in FIG. 6 are deviated to left and right, respectively.

FIG. 7 depicts detection areas when the center directions of the array antenna A and the array antenna B shown in FIG. 6 are deviated to the left and right, respectively. In the first embodiment, the center directions of the array antenna A and the array antenna B are oriented to the same direction. However, in the second embodiment, the center directions of the array antenna A and the array antenna B are oriented to the left and right, respectively. Each processing unit including the antenna unit according to the present embodiment has the same configuration as the configuration of the corresponding processing unit of the first embodiment.

A monopulse process according to the present embodiment is explained below. In FIG. 7, first, assume that any one of the array antenna A, the array antenna B, and the array antenna C is used to transmit a beam, and that the array antenna A and the array antenna B are used to perform the monopulse process. In this case, an azimuth of a target that is present in a detection area R2 near the center of the area can be detected. Similarly, when any one of the array antenna A and the array antenna C is used to transmit a beam, and when the array antenna A and the array antenna C are used to perform the monopulse process, an azimuth of a target that is present at the left side can be detected. On the other hand, when any one of the array antenna B and the array antenna C is used to transmit a beam, and when the array antenna B and the array antenna C are used to perform the monopulse process, an azimuth of a target that is present at the right side can be detected.

As explained above, in the present embodiment, a pair of antennas (the array antennas A and B) having narrow beam patterns, with beam directions deviated to the left and right from the center direction, respectively, and an antenna (the array antenna C) having a wide beam pattern that covers beam patterns of the pair of antennas, with beam directions oriented to the center direction, are configured on the same plane antenna. Therefore, an antenna beam suitable for the monopulse process can be formed, without changing a layout of antenna elements that constitute the array antenna, and without particularly combining beams.

When a wide-range detection area is to be covered, this detection area is divided into plural areas in which a phase distortion does not easily occur, like in the first embodiment. Any one of the above two processes is applied to each of the divided areas, while deviating the direction of a main beam of each antenna. With this arrangement, a correct azimuth without vagueness of angle can be detected. When the detection area is limited, angle precision of the detection azimuth within the detection area can be also improved.

In the present embodiment, the distance between the antenna element groups that constitute the array antenna A and the distance between the antenna element groups that constitute the array antenna B, respectively are set to two times of the distance between the antenna element groups that constitute the array antenna C. However, instead of setting the distance between the antenna element groups in this way, the width of the antenna element groups that constitute the array antenna A and the width of the antenna element groups that constitute the array antenna B, respectively can be also set to two times of the width of the antenna element groups that constitute the array antenna C, thereby obtaining a similar effect.

The distance or the width is not limited to the two times. What is important is that the beam pattern of the array antenna having a wide beam pattern substantially covers the beam patterns of a pair of array antennas having narrow beam patterns, with beam directions deviated to the left and right from the center direction, respectively. In other words, the distance between the antenna element groups of the array antenna having a wide beam pattern and the distance between the antenna element groups of the array antenna having a narrow beam pattern are related to beam eccentricities at the left and right of the array antenna having the narrow beam pattern and the beam pattern of the antenna element itself. Therefore, the antenna element and the distance between the antenna element groups can be determined based on these factors. Preferably, distances between the antenna element groups of the array antennas that constitute a pair of array antennas are set the same, from the viewpoint of symmetrical beam patterns.

As explained above, according to the monopulse radar apparatus of the present embodiment, a pair of antennas having a narrow beam pattern, with beam directions deviated from the center direction to the left and right or up and down, and an array antenna having a wide beam pattern that covers the beam patterns of the pair of antennas, with a beam direction oriented to the center direction are configured. Therefore, an antenna beam suitable for the monopulse process can be formed, without changing a layout of antenna elements that constitute the array antenna, and without particularly combining beams.

Third Embodiment

Figure 8:
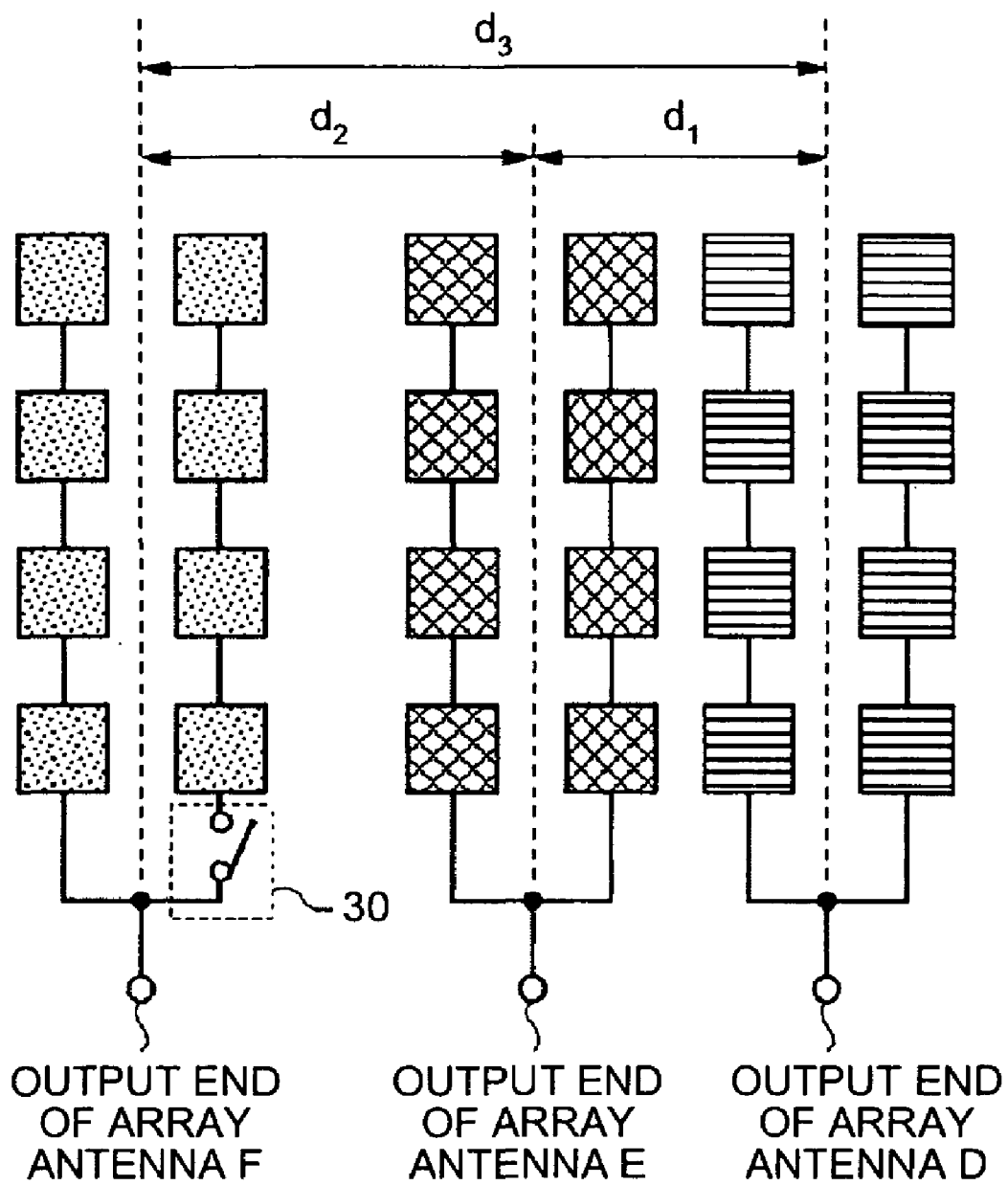
FIG. 8 depicts an antenna configuration of an antenna unit according to a third embodiment.

FIG. 8 depicts an antenna configuration of an antenna unit according to a third embodiment. The antenna unit according to the present embodiment has antenna elements disposed to have a slightly larger distance between the second antenna element group and the third antenna element group from the left, respectively, than the distance between the second antenna element group and the third antenna element group from the left, respectively of the plane array antenna according to the first or the second embodiment. On the other hand, each array antenna has a configuration, in which four antenna elements in the elevation direction are set as an antenna element group. Three array antennas including an array antenna D, an array antenna E, and an array antenna F are configured, by combining two antenna element groups, respectively. Unlike the configuration of the first embodiment, the array antenna F includes the first and the second antenna element groups from the left, respectively, the array antenna E includes the third and the fourth antenna element groups from the left, respectively, and the array antenna D includes the fifth and the sixth antenna element groups from the left, respectively. Based on this antenna configuration, a relationship of $d_1 < d_2 < d_3$ is established between $d_1$, $d_2$, and $d_3$, where $d_1$ represents a distance between the array antenna D and the array antenna E, $d_2$ represents a distance between the array antenna E and the array antenna F, and $d_3$ represents a distance between the array antenna D and the array antenna F. In other words, the three sets of a pair of array antennas, each pair having two array antennas, configure arrays having unequal distances.

In FIG. 8, a power feed line of one of the antenna element groups that constitute the array antenna F (the right-side antenna element group in FIG. 8) has a switch mechanism 30 that operates by receiving a control from the signal processing unit 20 not shown. The array antenna F is also used as a transmission antenna. When the array antenna F functions as a transmission antenna, power is not supplied to one of the antenna element groups that constitutes the array antenna F, based on the operation of the switch mechanism 30, and the other antenna element group that constitutes the array antenna F (the left-side antenna element group in FIG. 8) irradiates a predetermined wave. On the other hand, when the array antenna F functions as a reception antenna, the two antenna element groups that constitute the array antenna F output reception waves to the output terminal of the antenna F, based on the operation of the switch mechanism 30. Therefore, the array antenna F has a function equivalent to the function of the array antennas D and E. In other words, when the antenna unit is configured as shown in FIG. 8, the transmission antenna can be formed to have a wider beam pattern than the beam pattern of the reception antenna, like in the first and the second embodiments.

For the transmission antenna, any one of the six antenna element groups shown in FIG. 8 can be used. However, from the viewpoint of securing isolation between the transmission antenna and the reception antenna, it is suitable to use the most left-side antenna element group for the transmission antenna, in the configuration of the antenna unit shown in FIG. 8.

Figure 9:
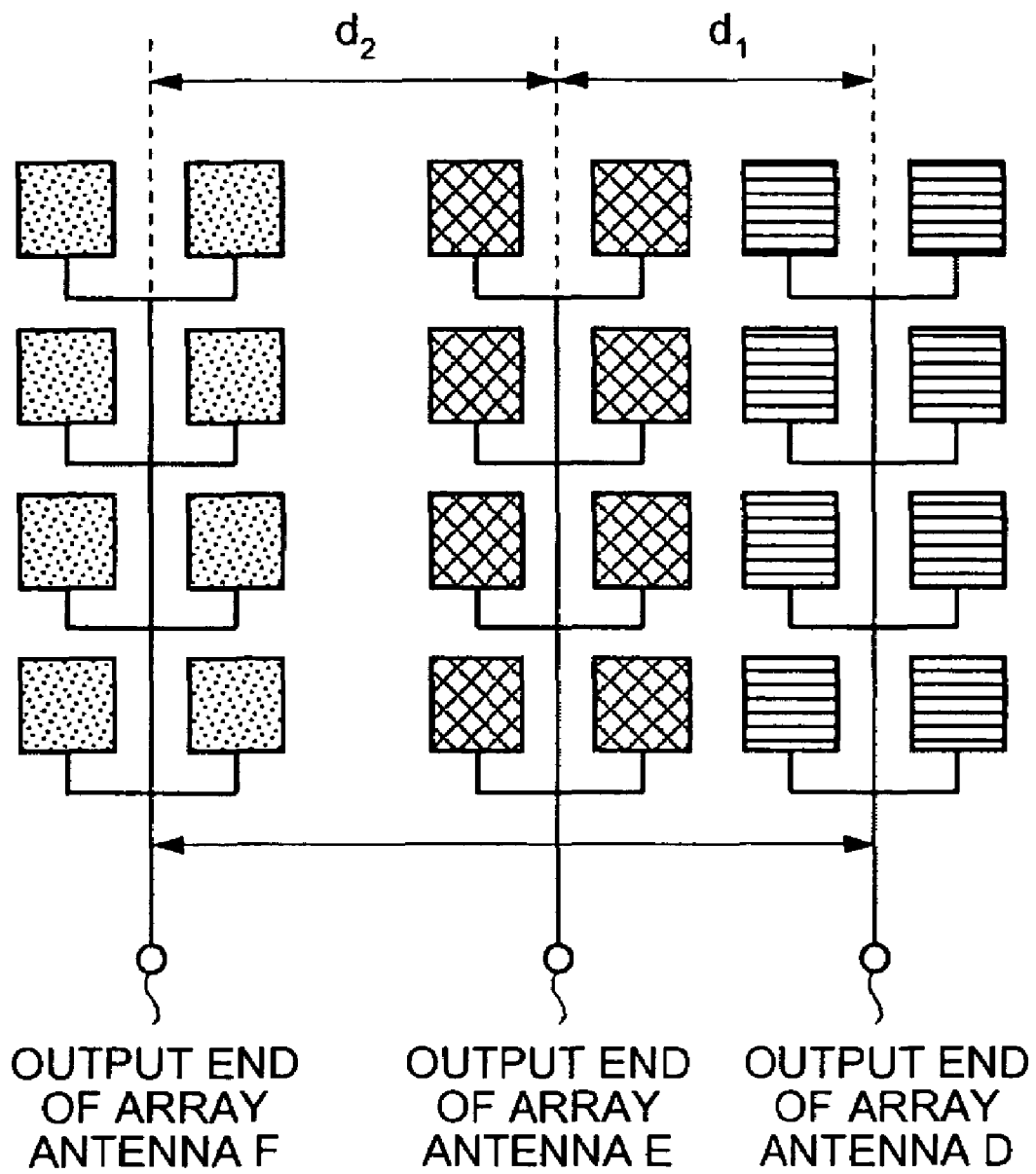
FIG. 9 depicts another state of supplying power to each antenna element of the antenna unit according to the third embodiment.

FIG. 9 depicts another state of supplying power to each antenna element of the antenna unit according to the third embodiment. In FIG. 8, four antenna elements in the elevation direction are used as one antenna element group, and power is supplied to each antenna element group. Alternatively, as shown in FIG. 9, each antenna element can be configured. In this case, to use the array antenna F as the transmission antenna, and also to provide this array antenna F with the function equivalent to that of the antenna unit shown in FIG. 8, a switch mechanism that switches between a power supply and a power non-supply to the four antenna element groups in the elevation direction is provided.

Figure 10:
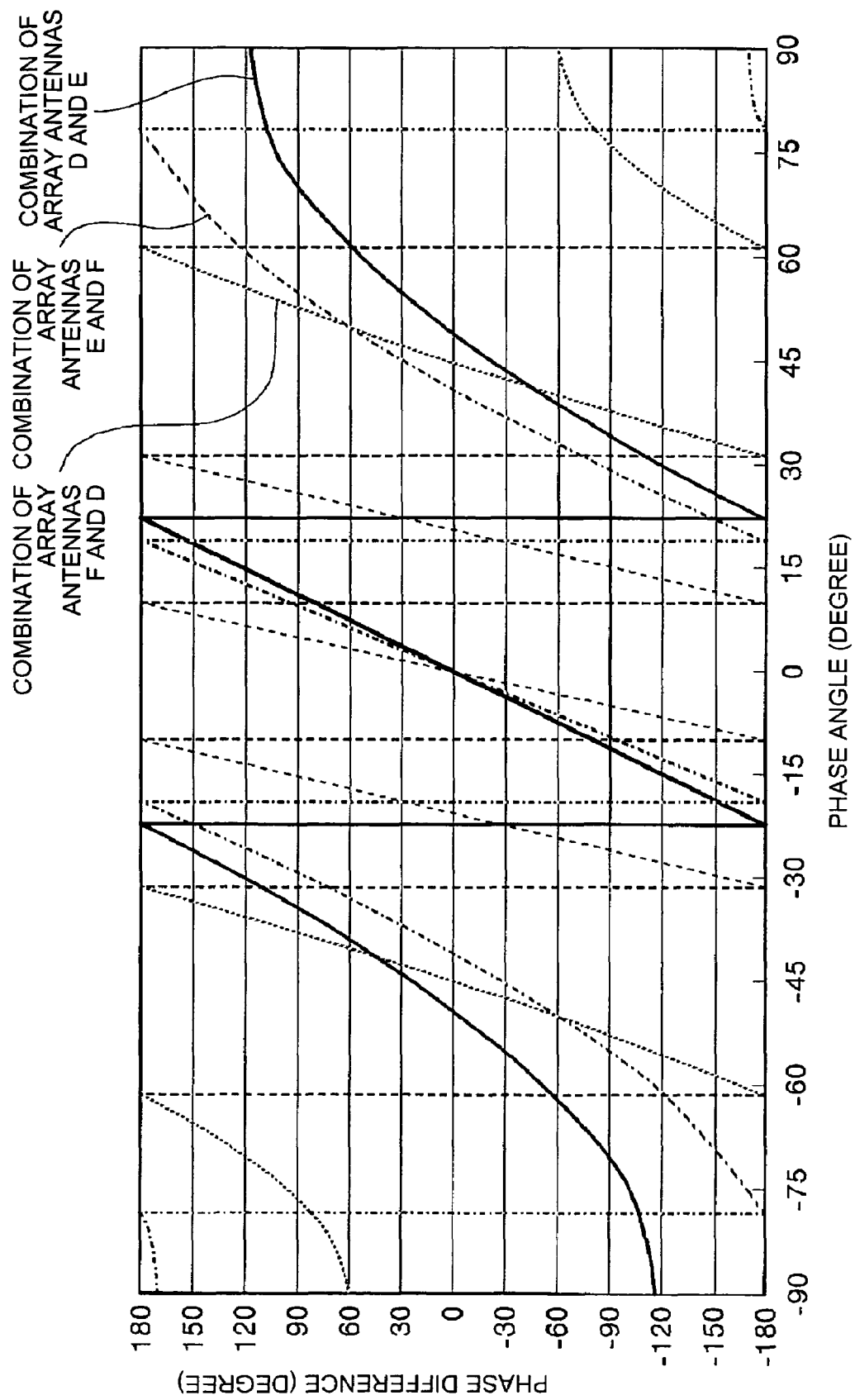
FIG. 10 is a graph of one example of a relationship between an azimuth angle and a phase difference when a phase-comparison monopulse process is performed based on three sets of a pair of antennas by combining two antennas out of the three antennas shown in FIG. 8.

FIG. 10 is a graph of one example of a relationship between an azimuth angle and a phase difference when a phase-comparison monopulse process is performed based on three sets of a pair of array antennas by combining two antennas out of the three antennas shown in FIG. 8. In FIG. 10, a curve shown in a solid line expresses a result of a phase-comparison monopulse process performed based on a combination of the array antenna D and the array antenna E. A curve shown in a dashed line expresses a result of a phase-comparison monopulse process performed based on a combination of the array antenna E and the array antenna F. A curve shown in a broken line expresses a result of a phase-comparison monopulse process performed based on a combination of the array antenna F and the array antenna D.

According to the graph shown in FIG. 10, change cycles of a phase difference calculated based on different combinations of antennas are different from each other. Therefore, a rough area can be specified by paying attention to a sign of a phase difference obtained from each combination of antennas. A phase-comparison monopulse process based on a combination of the array antenna F and the array antenna D having the distance $d_3$ is called a "first monopulse process". Similarly, a phase-comparison monopulse process based on a combination of the array antenna E and the array antenna F having the distance $d_2$ is called a "second monopulse process", and a phase-comparison monopulse process based on a combination of the array antenna D and the array antenna E having the distance $d_1$ is called a "third monopulse process".

In this case, when the azimuth angle at which a phase inversion of a phase difference first occurs in a first monopulse process in a right-side area from the front direction (that is, an azimuth angle $\theta>0$) is $\theta_1$, $\theta_1$*10 degrees. Similarly, when the azimuth angle at which a phase inversion of a phase difference first occurs in a second monopulse process is $\theta_2$, $\theta_2$*18.5 degrees. Therefore, when the azimuth angle $\theta$ is present within a range of $0<\theta<\theta_1$, signs of the phase difference due to the first, the second, and the third monopulse processes are all positive. On the other hand, when the azimuth angle $\theta$ is present within a range of $\theta_1<\theta<\theta_2$, signs of the phase difference due to the second and the third monopulse processes are positive. However, a sign of the phase difference due to the first monopulse process becomes negative. Because the antenna unit according to the present embodiment performs the monopulse process based on three array antennas using combination of two array antennas, $2^3=8$ areas can be specified.

When the number of areas to be specified is to be increased, the number of array antennas is set to four. For example, the number of antenna elements in FIG. 8 is increased to configure a fourth array antenna, in addition to the array antennas D, E, and F. A monopulse process is performed based on a combination of antennas in which a distance $d_4$ between the fourth array antenna and other array antennas is $d_4 \neq d_1, d_2, d_3$.

Alternatively, array antennas having different antenna distances can be configured without increasing the number of antenna elements. In this case, when a fifth array antenna including the fourth and the fifth antennas from the left, respectively is configured in FIG. 8, there is a relationship of $d_1<d_2<d_5<d_3$ among the distances $d_1, d_2, d_3$, and a distance $d_5$ between the fifth array antenna and the array antenna F. A monopulse process can be performed, using these array antennas. The number of array antennas that becomes the base for performing these monopulse processes is not limited to the above three or four. It is needless to mention that five or more array antennas can be configured, and a monopulse process can be performed based on plural sets of a pair of array antennas by combining two array antennas out of these array antennas.

In the graph shown in FIG. 10, an area in which signs of phase differences due to the first, the second, and the third monopulse processes all become positive is also present near an azimuth angle 50 degrees, in addition to the above $0<\theta<\theta_1$. Which one of these areas is to be selected is determined based on an antenna pattern. For example, when the antenna beam is oriented to a direction of 0 degree, and when a half-maximum full-width is about 20 degrees, a result of detection in the 0-degree direction can be employed.

Figure 11:
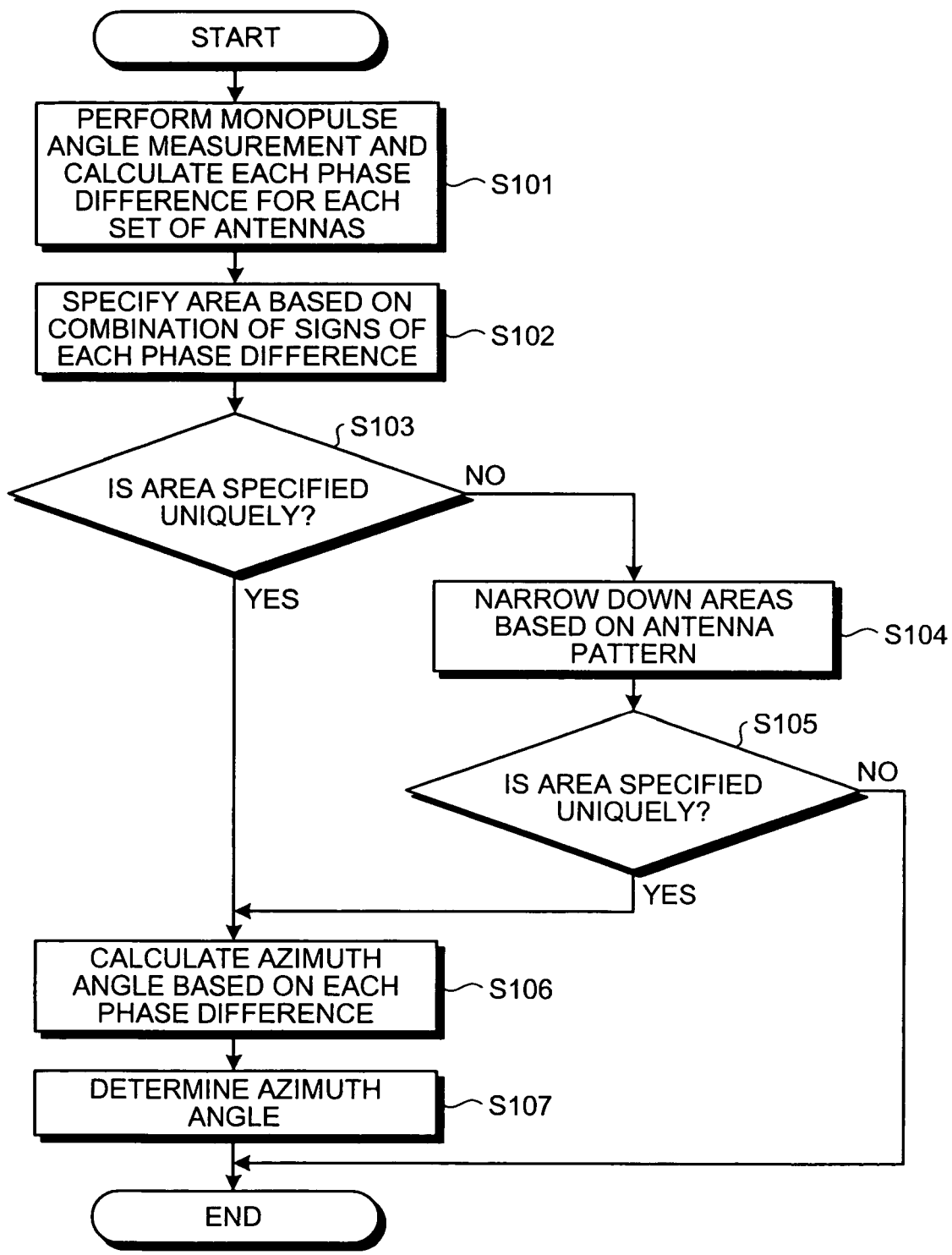
FIG. 11 is a flowchart of a process according to the third embodiment.

FIG. 11 is a flowchart of the process performed by the signal processing unit based on the configuration of the antenna unit according to the third embodiment. This flowchart makes the above processing flow clear. The signal processing unit 20 shown in FIG. 1 performs these processes. The signal processing unit 20 performs a monopulse angle measurement for each set of array antennas (a combination of array antennas that perform the first, the second, or the third monopulse process), thereby calculating each phase difference (step S101). The signal processing unit 20 specifies an area in which there is a possibility of presence of a target, based on signs of these phase differences (step S102). The signal processing unit 20 determines whether an area having a possibility of presence of a target is uniquely specified (step S103).

When an area is specified uniquely (step S103, Yes), the signal processing unit 20 calculates an azimuth angle based on each phase difference (step S106), and determines an azimuth angle (step S107). In the determination of the azimuth angle at step S107, an average value of angles calculated at step S106, for example, can be employed. The signal processing unit 20 compares each angle calculated at step S106 with a detection result of the last scan, and can employ a value nearest the last result. When a future position is forecast using a speed or acceleration, a value nearest the forecast position can be employed.

When an area cannot be specified uniquely (step S103, No), the signal processing unit 20 narrows down the selection based on an antenna pattern (step S104). The narrow-down process is as described above. The signal processing unit 20 determines again whether an area is specified uniquely, in a similar manner to that of the process at step S103 (step S105). When an area is specified uniquely (step S105, Yes), the process shifts to the process at step S106, and the signal processing unit 20 determines an azimuth direction. On the other hand, when an area cannot be specified uniquely (step S105, No), the signal processing unit 20 does not calculate or determine an azimuth angle in this detection process (scan).

Figure 12:
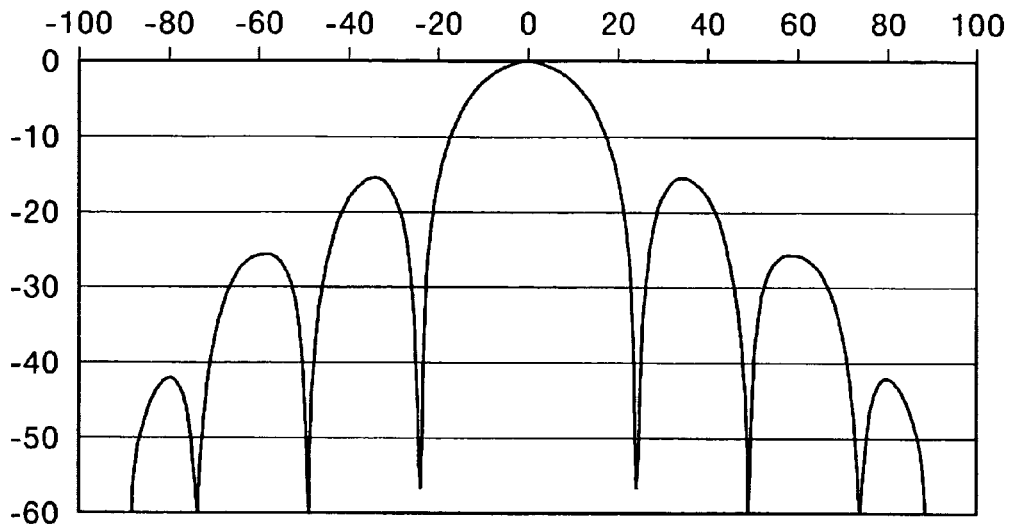
FIG. 12 is one example of a beam pattern of an antenna element that constitutes the antenna unit.

FIG. 12 is one example of a beam pattern of an antenna element that constitutes the antenna unit. At step S104 in FIG. 11, a narrow-down process based on an antenna pattern is explained. In this process, an antenna pattern is understood in advance, and an area is specified using reception level information of an antenna. On the other hand, in the configuration example of the present embodiment, it is described that an area in which signs of phase differences due to the first, the second, and the third monopulse processes all become positive is also present near the azimuth angle 50 degrees, in addition to the above $0<\theta<\theta_1$, as shown in FIG. 10. In this case, when an antenna element having an antenna pattern as shown in FIG. 11 is used, a gain near 50 degrees becomes small, and a signal in the area having the same phase relationship cannot be received easily. When this antenna element is used, a narrow-down process based on the antenna pattern at step S104 as shown in FIG. 11 does not need to be performed to at least a reception signal near 50 degrees.

This means that the layout of the antenna can be determined (or is determined) based on the beam pattern of the antenna element. In general, the degree of freedom of the layout of antennas is larger than the degree of freedom of the design of antenna elements, depending on the platform on which the antenna unit is mounted or the frequency band to be used. In this case, a desired characteristic can be obtained easily and a flexible designing becomes possible, by determining the layout of antennas based on the beam pattern of the antenna element.

As explained above, the monopulse radar apparatus according to the present embodiment performs the monopulse process based on three or more sets of a pair of antennas having different distances between elements by combining two antennas out of three or more antennas that are configured in the antenna unit. Therefore, vagueness due to a phase distortion in the monopulse signal process can be eliminated. An antenna beam suitable for the monopulse process can be formed, without particularly changing a layout of antenna elements that constitute the array antenna, and without particularly combining beams.

Fourth Embodiment

Figure 13:
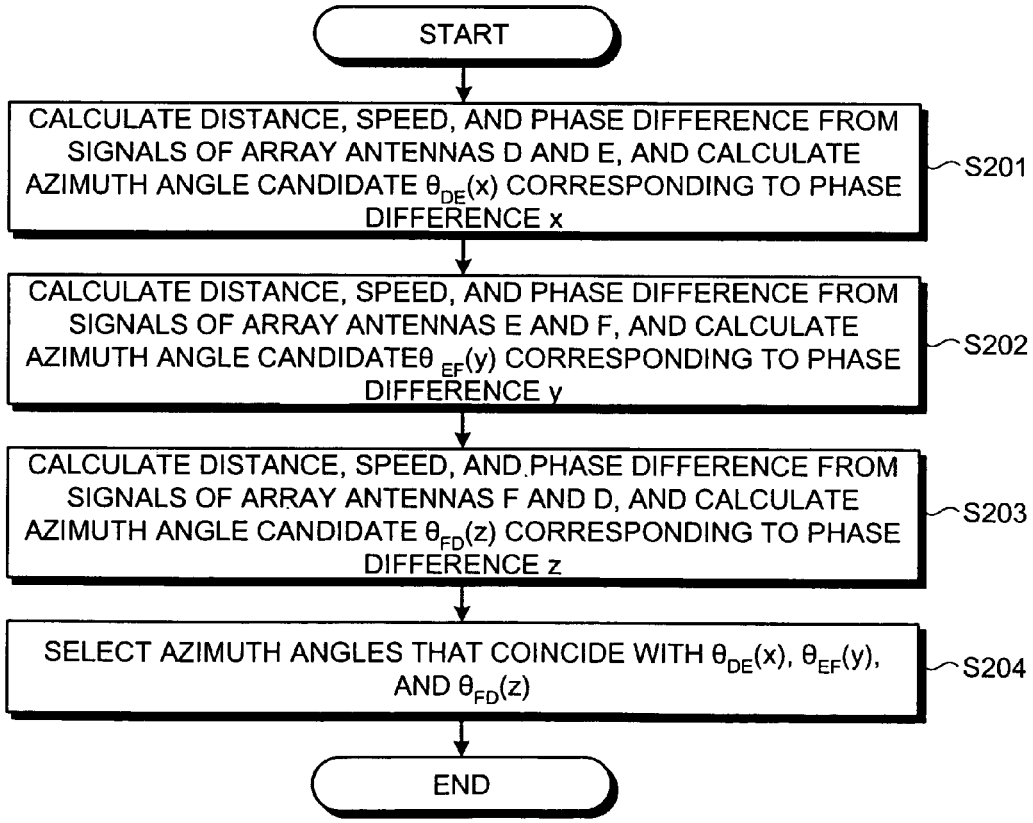
FIG. 13 is a flowchart of a process performed by a signal processing unit according to a fourth embodiment.

FIG. 13 is a flowchart of the process performed by the signal processing unit according to a fourth embodiment. In the third embodiment, a monopulse angle measurement is performed for each combination of array antennas based on which plural monopulse processes are performed. An area having a possibility of presence of a target is specified based on signs of detected phase differences. Thereafter, an azimuth angle in which a target is present is calculated. On the other hand, in the present embodiment, a monopulse angle measurement is performed for each combination of array antennas based on which plural monopulse processes are performed. Candidates of azimuth angles in which presence of a target is assumed are calculated for each phase difference. Azimuth angles that coincide are selected from among targets of the same speed and the same distance. The configuration of each processing unit including the antenna unit according to the present embodiment is the same as the configuration according to the third embodiment.

The processing flow shown in FIG. 13 is explained next. The signal processing unit 20 shown in FIG. 1 performs these processes. The signal processing unit 20 performs a predetermined process including a monopulse angle measurement as a monopulse radar apparatus, from signals of the array antennas D and E. The signal processing unit 20 also calculates a distance and a speed of a target, and a phase difference x, and calculates an azimuth candidate $\theta_{DE}(x)$ corresponding to a phase difference x as an azimuth angle in which there is a possibility of presence of a target (step S201). The signal processing unit 20 similarly calculates an azimuth angle candidate $\theta_{EF}(y)$ corresponding to a phase difference y based on the array antennas E and F (step S202), and calculates an azimuth angle candidate $\theta_{FD}(z)$ corresponding to a phase difference z based on the array antennas F and D (step S203). The signal processing unit 20 selects azimuth angles that coincide with $\theta_{DE}(x)$, $\theta_{EF}(y)$, and $\theta_{FD}(z)$ calculated at steps S201 to S203, from data group of the same distance and the same speed, for the azimuth angle to be output (step S204).

Figure 14:
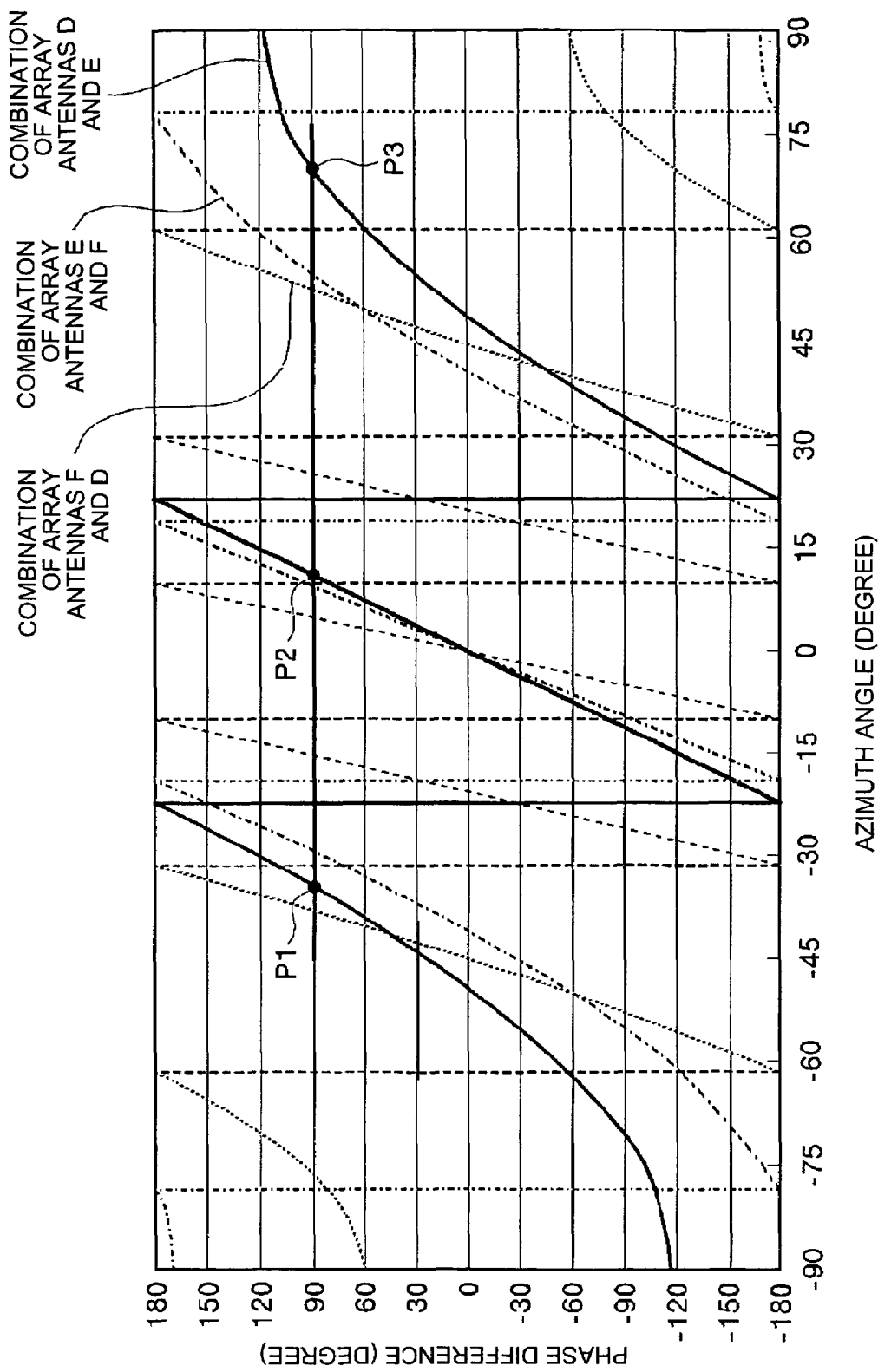
FIG. 14 depicts three candidate examples of a target azimuth angle calculated based on a combination of array antennas D and E, on the graph shown in FIG. 10.

A detailed example of the above process is explained next. FIG. 14 depicts three candidate examples of a target azimuth angle calculated based on the combination of the array antennas D and E, on the graph shown in FIG. 10. For example, as shown in FIG. 14, when a phase difference of a focused target is 90 degrees among plural targets detected based on the combination of the array antennas D and E, three azimuth angles P1, P2, and P3 are calculated as the azimuth angle candidate $\theta_{DE}$. Next, azimuth angles that coincide with the azimuth angle candidate $\theta_{DE}$ and the azimuth angle candidate $\theta_{EF}$ in predetermined precision are selected from among the data group within predetermined distance precision and predetermined speed precision of the focused target, among plural targets detected based on the combination of the array antennas E and F. A similar process is also executed for the combination of the array antennas F and D. Through these processes, a set of a distance, a speed, and an azimuth angle is determined uniquely.

Because there is no master-servant relationship concerning the combination of array antennas, the process can be started from any one of the processes at steps S201 to S203 shown in FIG. 13. While an azimuth angle is specified based on three sets of a pair of array antennas in the present embodiment, the number of sets is not limited to three. An azimuth angle can be specified using two or more sets of a pair of array antennas.

However, when the azimuth angle is specified based on the three sets of a pair of array antennas like in the present embodiment, the following advantages can be obtained. For example, when an azimuth angle is specified based on two sets of a pair of array antennas, a comparison process of azimuth angle candidates is carried out once. Assume that an error probability of an azimuth angle is 0.05 (that is, one error per 20 times), when an azimuth angle is specified based on two sets of a pair of array antennas. At the time of specifying an azimuth angle based on three sets of a pair of array antennas, a comparison process of azimuth angle candidates is executed twice. Therefore, in this case, an error probability of an azimuth angle is very low of 0.05×0.05=0.0025 (that is, once per 4,000 times). Consequently, an error probability of an azimuth angle can be made small, by using three sets of a pair of array antennas.

As explained above, according to the monopulse radar apparatus of the present embodiment, a monopulse process is performed based on two or more sets of a pair of antennas having different distances between elements by combining two antennas out of three or more antennas that are structured in the antenna unit. Therefore, vagueness due to a phase distortion in the monopulse signal process can be removed. An antenna beam suitable for the monopulse process can be formed, without particularly changing a layout of antenna elements that constitute the array antenna, and without particularly combining beams.

Fifth Embodiment

Figures 1, 15:
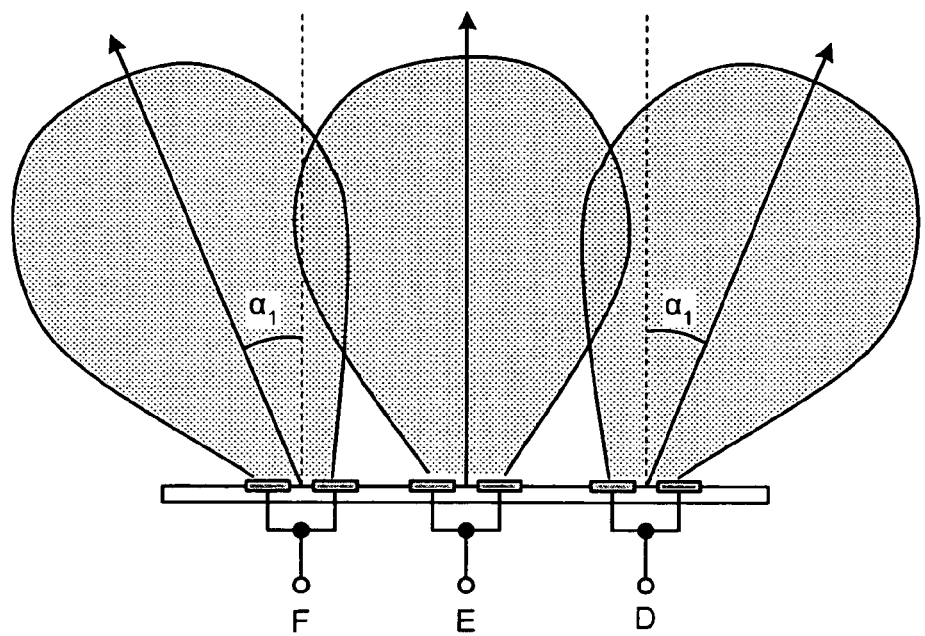
Figures 2, 15:
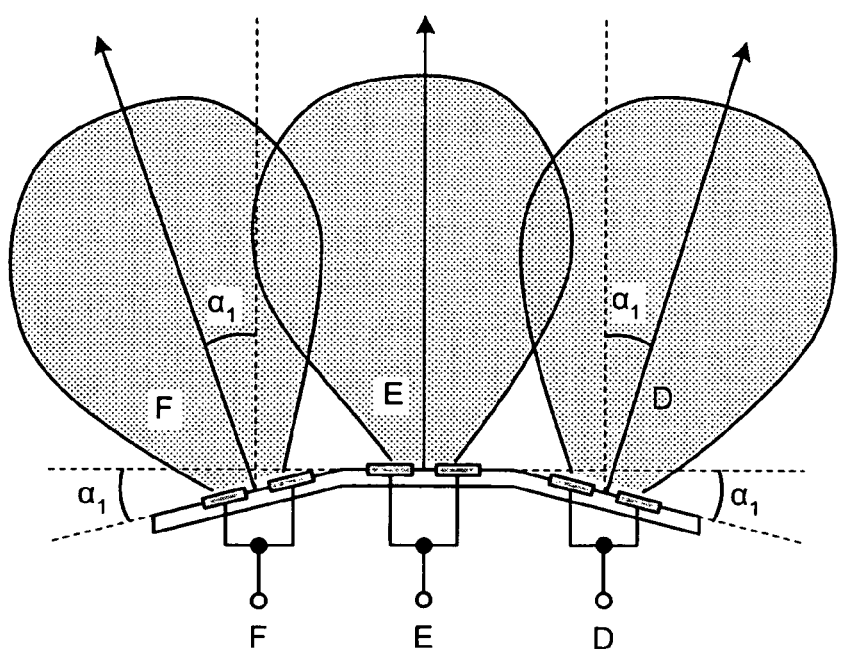

FIG. 15-1 is a cross-sectional view of an approximate shape of an orthogonal cross-section that is orthogonal to both the antenna element layout surface and the antenna element groups of the antenna unit shown in FIG. 8. FIG. 15-1 also depicts outline antenna beams of the three array antennas (the array antennas D, E, and F) configured by two antenna element groups, respectively. On the other hand, FIG. 15-2 is a cross-sectional view of an approximate shape of an orthogonal cross-section that is orthogonal to both the antenna element layout surface and the antenna element groups of an antenna unit according to a fifth embodiment. FIG. 15-2 also depicts outline antenna beams of the three array antennas (the array antennas D, E, and F) configured by two antenna element groups, respectively. These antenna beams are substantially the same as the antenna beams shown in FIG. 15-1.

A configuration of the antenna unit according to the present embodiment is explained next. In the antenna unit shown in FIG. 15-2, when the layout surface of the antenna elements (or the antenna element groups) that constitute the array antenna E is assumed as a "reference layout surface", the layout surface of the antenna elements that constitute the array antenna D is inclined by a predetermined angle of inclination ($\alpha_1$) in an azimuth right direction form the reference layout surface. On the other hand, the layout surface of the antenna elements that constitute the array antenna F is inclined by the predetermined angle of inclination ($\alpha_1$) in an azimuth left direction form the reference layout surface. The inclination angle ($\alpha_1$) is the angle formed by the beam center directions of the array antennas D and F relative to the beam center direction of the array antenna E.

Based on the configuration shown formed in FIG. 15-2, the beam center direction of the array antenna D can be rotated by the predetermined angle (an angle of eccentricity) ($\alpha_1$) to the azimuth right direction from the beam center direction of the array antenna E, without particularly combining directivity of the antenna element groups. Similarly, the beam center direction of the array antenna F can be rotated by the predetermined angle of eccentricity ($\alpha_1$) to the azimuth left direction from the beam center direction of the array antenna E, without particularly combining directivity of the antenna element groups.

In the configuration shown in FIG. 15-1, plural beams as shown in this drawing can be also formed, by combining beams between the antenna element groups that constitute each array antenna. However, this configuration has a disadvantage in that a stable characteristic cannot be obtained easily in the whole area of a detected range, due to interferences between the antenna elements or between the antenna element groups or due to a slight increase of the sidelobe. On the other hand, in the configuration shown in FIG. 15-2, the sidelobe can be controlled easily, and a stable characteristic can be obtained in the whole area of the detection range, although the number of production man-hours (tact) slightly increases.

As explained above, according to the monopulse radar apparatus of the present embodiment, the main beam direction of one array antenna is deviated to the left direction or the up direction from the center direction, out of three or more sets of a pair of array antennas. The layout surface of the antenna elements that constitute this array antenna is disposed by inclining the layout surface to the left direction or the up direction by a predetermined inclination angle from the reference layout surface. At the same time, the main beam direction of the other array antenna is deviated to the right direction or the down direction from the center direction, out of the three or more sets of a pair of array antennas. The layout surface of the antenna elements that constitute this array antenna is disposed by inclining the layout surface to the right direction or the down direction by a predetermined inclination angle from the reference layout surface. Accordingly, the sidelobe can be controlled easily, without particularly combining directivity between the antenna element groups, and a stable characteristic can be obtained in the whole area of the detection range.

In the present embodiment, the layout surfaces of the antenna elements that constitute the array antennas D and F are inclined by the same angle ($\alpha_1$) to the left and right directions, respectively, in rotating the beam center directions of the array antennas to the azimuth right direction and the azimuth left direction by the predetermined eccentricity angle ($\alpha_1$) from the beam center direction of the array antenna E. However, these inclination angles are not necessarily required to be the same angle ($\alpha_1$). What is important is that an inclination angle is set such that the control of the sidelobe of each array antenna becomes easy, and that a stable characteristic is obtained in the whole area of the detection range.

In the present embodiment, the antenna elements are laid out on the inclination surface that is inclined to match the beam center direction of the antenna element. Alternatively, the antenna elements can be laid out on the surface having a predetermined curvature, or on a spherical surface, or on an oval spherical surface. In this case, an effect equivalent to that of the above can be obtained.

Sixth Embodiment

Figures 1, 16:
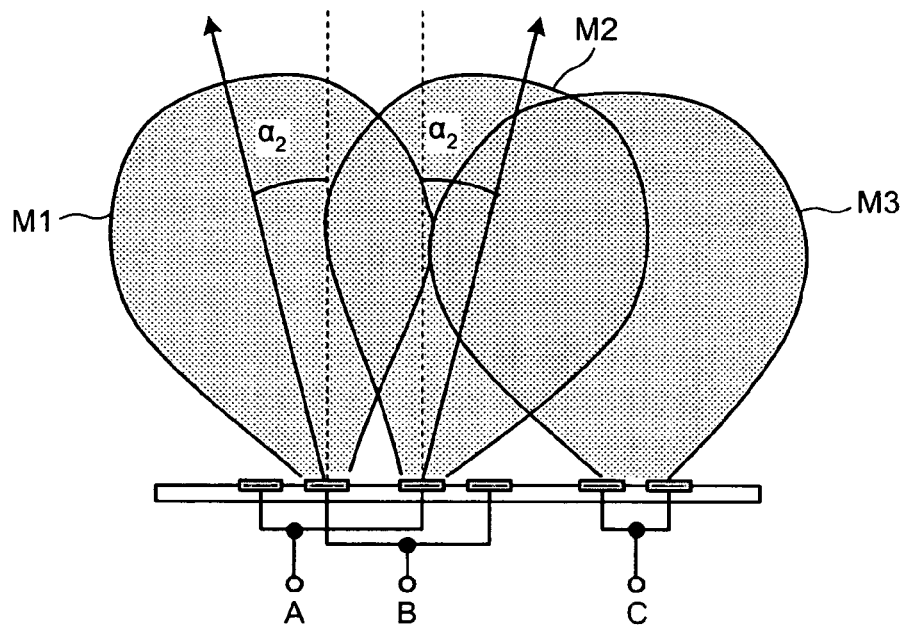
Figures 2, 16:
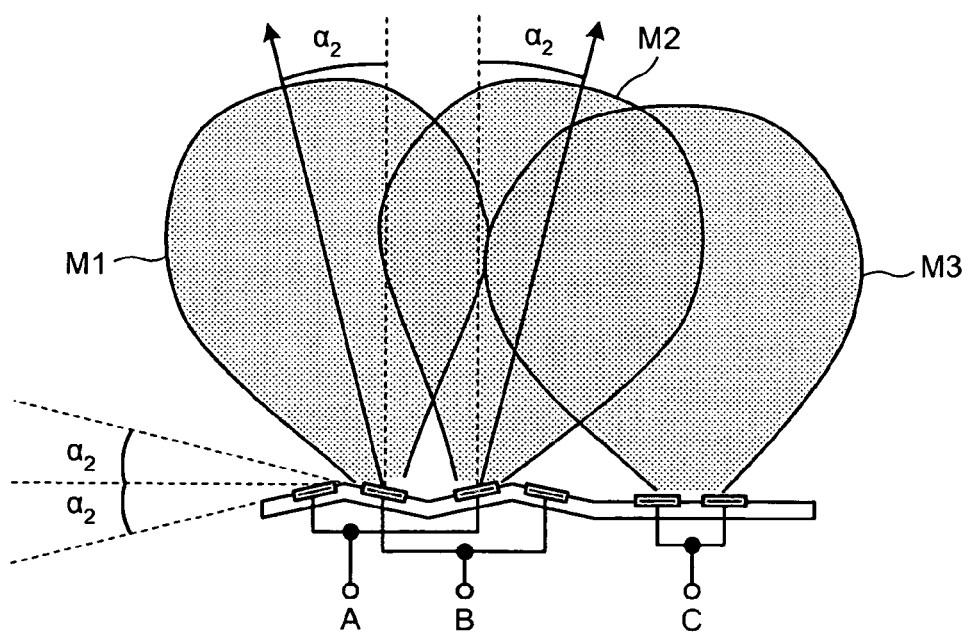

FIG. 16-1 is a cross-sectional view of an approximate shape of an orthogonal cross-section that is orthogonal to both the antenna element layout surface and the antenna element groups of the antenna unit shown in FIG. 4. FIG. 16-1 also depicts outline antenna beams M1, M2, and M3 that correspond to the three array antennas A, B, and C configured by two antenna element groups, respectively. On the other hand, FIG. 16-2 is a cross-sectional view of an approximate shape of an orthogonal cross-section that is orthogonal to both the antenna element layout surface and the antenna element groups of an antenna unit according to a sixth embodiment. FIG. 16-2 also depicts the outline antenna beams M1, M2, and M3 that correspond to the three array antennas A, B, and C configured by two antenna element groups, respectively. These antenna beams are substantially the same as the antenna beams shown in FIG. 16-1.

A configuration of the antenna unit according to the present embodiment is explained next. In FIG. 16-1 and FIG. 16-2, the array antenna A includes the first and the third antenna element groups from the left, respectively, the array antenna B includes the second and the fourth antenna element groups from the left, respectively, and the array antenna C includes the fifth and the sixth antenna element groups from the left, respectively. In the antenna unit shown in FIG. 16-2, when the layout surface of the antenna elements that constitute the array antenna C, that is, the fifth and the sixth antenna element groups from the left, is assumed as a "reference layout surface", the layout surface of the antenna elements that constitute the array antenna B, that is, the first and the third antenna element groups from the left, is inclined by a predetermined angle of inclination ($\alpha_2$) in an azimuth left direction form the reference layout surface. On the other hand, the layout surface of the antenna elements that constitute the array antenna A, that is, the second and the fourth antenna element groups from the left, is inclined by the predetermined angle of inclination ($\alpha_2$) in an azimuth right direction form the reference layout surface. Based on the configuration shown formed in FIG. 16-2, the beam center direction of the array antenna A can be rotated by the predetermined angle of eccentricity ($\alpha_2$) to the azimuth right direction from the beam center direction of the array antenna C, without particularly combining directivity of the antenna element groups. Similarly, the beam center direction of the array antenna B can be rotated by the predetermined angle of eccentricity ($\alpha_2$) to the azimuth right direction from the beam center direction of the array antenna C, without particularly combining directivity of the antenna element groups.

In the configuration shown in FIG. 16-1, plural beams as shown in this drawing can be also formed, by combining beams between the antenna element groups that constitute each array antenna. However, this configuration has a disadvantage in that a stable characteristic cannot be obtained easily in the whole area of a detected range, due to interferences between the antenna elements or between the antenna element groups or due to a slight increase of the sidelobe. On the other hand, in the configuration shown in FIG. 16-2, the sidelobe can be controlled easily, and a stable characteristic can be obtained in the whole area of the detection range, although the number of production man-hours (tact) slightly increases.

As explained above, according to the monopulse radar apparatus of the present embodiment, the main beam direction of one array antenna is deviated to the left direction or the up direction from the center direction, out of a predetermined pair of array antennas. The layout surface of the antenna elements that constitute this array antenna is disposed by inclining the layout surface to the left direction or the up direction by a predetermined inclination angle from the reference layout surface. At the same time, the main beam direction of the other array antenna is deviated to the right direction or the down direction from the center direction, out of the predetermined pair of array antennas. The layout surface of the antenna elements that constitute this array antenna is disposed by inclining the layout surface to the right direction or the down direction by a predetermined inclination angle from the reference layout surface. Accordingly, the sidelobe can be controlled easily, without particularly combining directivity between the antenna element groups, and a stable characteristic can be obtained in the whole area of the detection range.

In the present embodiment, the layout surfaces of the antenna elements that constitute the array antennas A and B are inclined by the same angle ($\alpha_2$) to the left and right directions, respectively, in rotating the beam center directions of the array antennas to the azimuth left direction and the azimuth right direction by the predetermined eccentricity angle ($\alpha_2$) from the beam center direction of the array antenna C. However, these inclination angles are not necessarily required to be the same angle ($\alpha_2$). What is important is that an inclination angle is set such that the control of the sidelobe of each array antenna becomes easy, and that a stable characteristic is obtained in the whole area of the detection range.

Seventh Embodiment

In the first to the sixth embodiments, many examples of a monopulse radar apparatus using array antennas having antenna elements effectively disposed in the limited space are explained. On the other hand, to switch control the effectively-disposed antennas of these embodiments to a transmitting and receiver, the switch control needs to be performed via the antenna switch 12 shown in FIG. 1, for example. Further, the antenna-switch-signal generating unit 19 needs to transmit a necessary control signal to the antenna switch 12 and the reception unit. In the present embodiment, a configuration of the antenna switch 12 shown in FIG. 1 and one example of a control signal that is output from the antenna-switch-signal generating unit 19 are explained. An on-vehicle radar apparatus including an FM-CW radar that measures a distance between a vehicle and a target and a relative speed by using an electronic wave that is frequency-modulated by a triangular wave is used as an example for the explanation.

The installation position of the on-vehicle radar apparatus is limited from the nature of the vehicle as a mounting platform. On the other hand, the installation area of plural antennas and the number of high-frequency parts required in the transmitting and receiver need to be decreased, to decrease sizes and weights of these parts to avoid the increase in the vehicle prices, from the viewpoint of securing competitiveness with other competitors. Further, reduction of sizes and weights become effective techniques for various radar apparatuses as well as the on-vehicle radar apparatus. The antenna switch is a technique that achieves a further reduction in sizes and weights of radar apparatuses. From this viewpoint, a configuration and operation of the radar apparatus are explained below.

Figure 17:
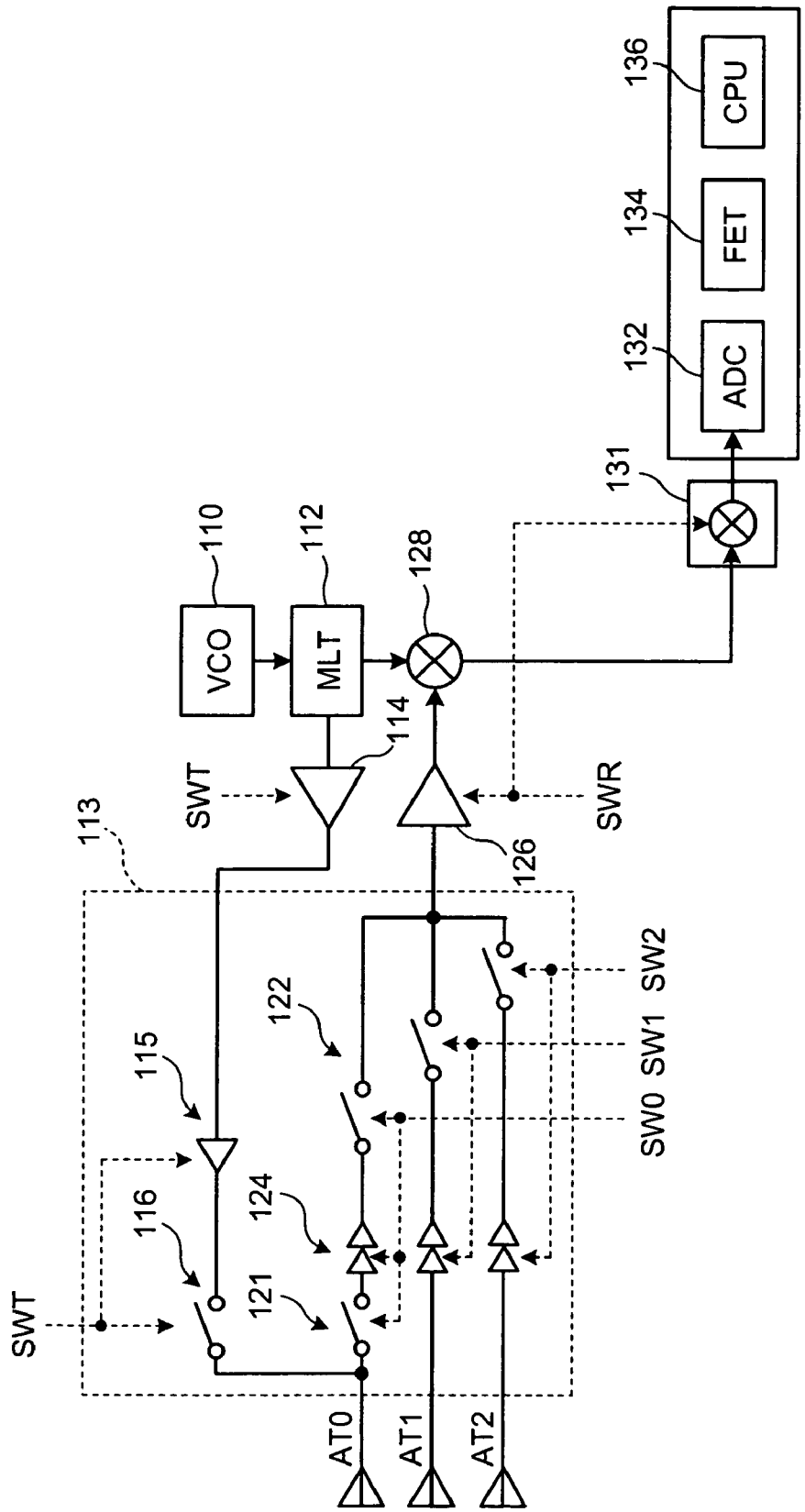
FIG. 17 is an example of a configuration of an on-vehicle FM-CW radar apparatus to which an antenna switch according to an embodiment of the present invention is applied.

FIG. 17 is a block diagram of a configuration of an on-vehicle FM-CW radar apparatus to which the antenna switch according to a seventh embodiment is applied. In FIG. 17, a voltage control oscillator (VCO) 110 outputs a triangular wave, and a multiplier (MLT) 112 multiplies a transmission signal FM modulated by the triangular wave, into a millimeter-wave band. A transmission amplifier 114 amplifies the millimeter-wave band, and inputs the amplified wave into an antenna switch 113. The antenna switch 113 transmits the wave from an antenna AT0 via an amplifier 115 and a switch 116. In the radar apparatus shown in FIG. 17, only the antenna AT0 is used to transmit the wave, out of three antennas AT0, AT1, and AT2. Out of the three antennas AT0, AT1, and AT2, an antenna that is selected by a switch 122 is used to receive a wave. A switch 121 that blocks the entrance of a transmission signal to the reception side is provided between the antenna AT and an amplifier 124. When other unit can block the entrance of a signal to the reception side, the switches 116 and 121 are not always necessary.

The amplifier 124 amplifies a reception signal received by each antenna. The switch 122 selects an amplified reception signal. A reception amplifier 126 amplifies the selected reception signal. A mixer 128 mixes this signal with a part of a transmission wave, and generates a beat signal. An analog-to-digital converter (ADC) 132 converts the beat signal generated by the mixer 128 into a digital signal. A fast Fourier transform (FFT) processing unit 134 high-speed Fourier transforms the digital signal, and inputs the Fourier-transformed signal to a central processing unit (CPU) 36. A mixer 131 is provided to cancel a frequency superimposed on the beat signal due to a switching between a transmission and a reception with a control signal SWR, by mixing the same frequency.

As shown in FIG. 17, on and off of the switch 116 is interlocked with on and off of the amplifier 115 that turns on and off a bias voltage. A selection performed by the switches 121 and 122 is interlocked with on and off of the amplifier 124.

Figure 18:
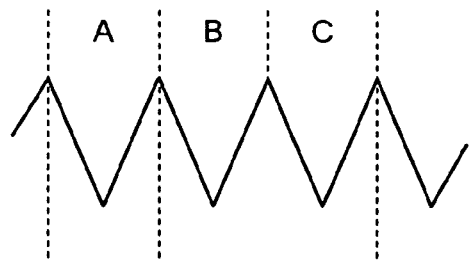
FIG. 18 is a waveform diagram of a modulation wave by a triangular wave.
Figure 19:
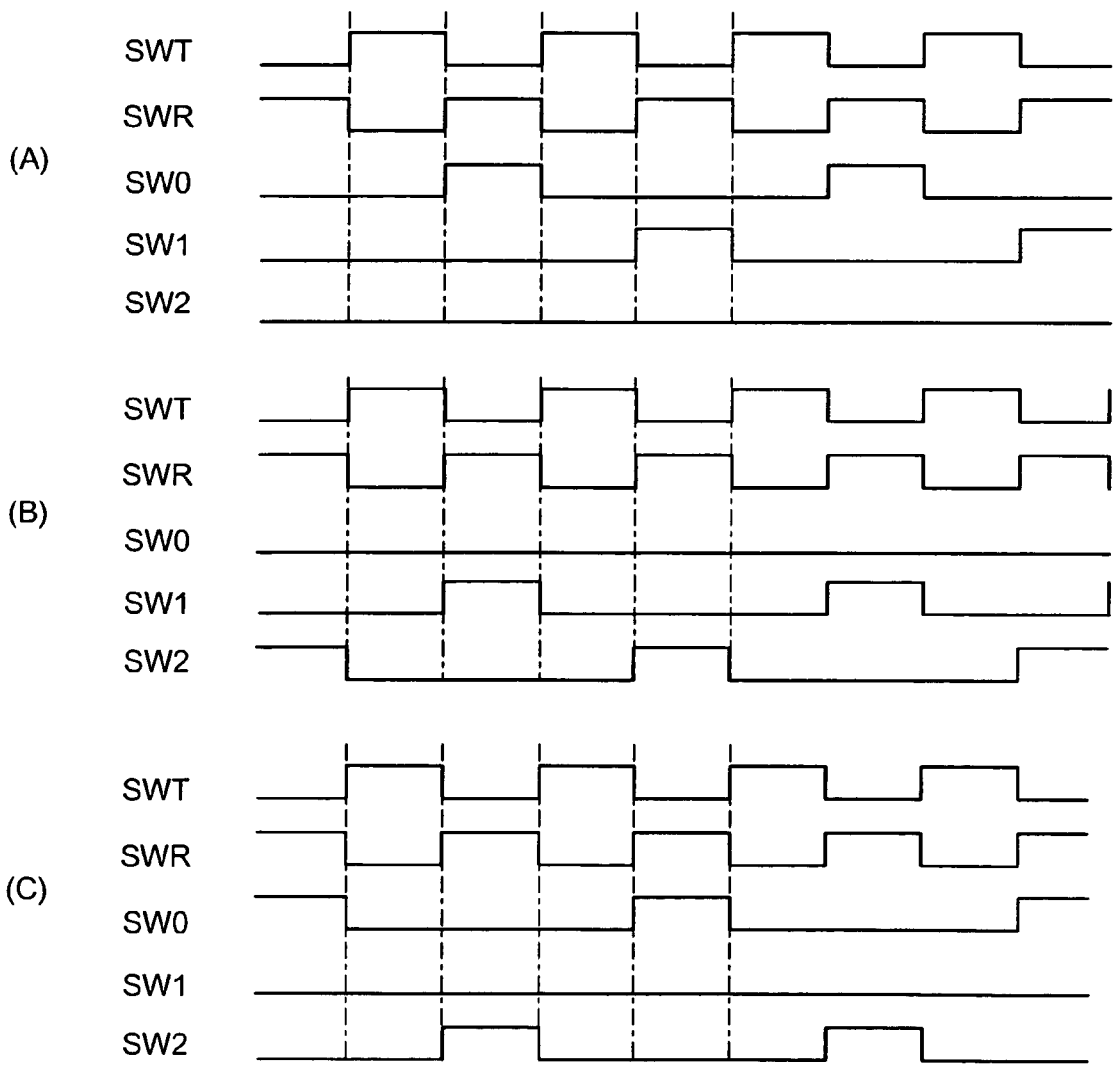
FIG. 19 is a waveform diagram of waveforms of control signals shown in FIG. 17.

FIG. 18 depicts a waveform of the triangular wave that is input to the voltage control oscillator 10. In FIG. 19, columns A to C represent waveforms of control signals SWT, SWR, SW0, SW1, and SW2 in sections A to C shown in FIG. 18, respectively. A timescale of a horizontal axis of the graph in FIG. 18 is compressed considerably as compared with the timescale of the graphs shown in FIG. 19.

In a first period of the triangular wave shown in FIG. 18, that is, in the section A, "transmission" to "reception by AT0" to "transmission" to "reception by AT1" is repeated, as is clear from FIG. 19(A). In other words, in the section A, data of the beat signal in the up section and the down section of a triangular wave generated from the reception signals of the reception antennas AT0 and AT1 are collected. A frequency of a peak that appears in the result of a Fourier transform is used to calculate a distance between the vehicle and the target and a relative speed. A phase of the peak is used to calculate a phase monopulse in the antennas AT0 and AT1.

In the next period of the triangular wave shown in FIG. 18, that is, in the section B, "transmission" to "reception by AT1" to "transmission" to "reception by AT2" is repeated, as is clear from FIG. 19(B). In other words, in the section B, data of the beat signal in the up section and the down section of a triangular wave generated from the reception signals of the reception antennas AT1 and AT2 are collected. A frequency of a peak that appears in the result of a Fourier transform is used to calculate a distance between the vehicle and the target and a relative speed. A phase of the peak is used to calculate a phase monopulse in the antennas AT1 and AT2.

In the next period of the triangular wave shown in FIG. 18, that is, in the section C, "transmission" to "reception by AT2" to "transmission" to "reception by AT0" is repeated, as is clear from FIG. 19(C). In other words, in the section C, data of the beat signal in the up section and the down section of a triangular wave generated from the reception signals of the reception antennas AT2 and AT0 are collected. A frequency of a peak that appears in the result of a Fourier transform is used to calculate a distance between the vehicle and the target and a relative speed. A phase of the peak is used to calculate a phase monopulse in the antennas AT2 and AT0.

As explained above, according to the antenna switch of the present embodiment, a transmission signal amplified by a first amplifier is supplied to one antenna via a second switch. A first switch selects any one of outputs of plural third amplifiers that amplify the output of a second amplifier that amplifies a reception signal of the one antenna, and reception signals of other plural antennas, respectively. The first switch supplies the selected output to the receiver. Therefore, the size and the weight of the antenna switch as a constituent part of the radar apparatus can be made smaller.

When a switch is used to decrease the number of antennas by sharing an antenna to transmit and receive signals and to decrease the number of high-frequency parts that are necessary for the transmitting and receiver by commonly processing the reception signals of plural reception antennas, a loss of a signal occurs due to the switch, and the performance becomes low. Therefore, when the switch is used, it is preferable to dispose the amplifier near the antenna.

When all reception antennas are used to share the transmission and reception of signals to decrease the number of reception antennas, the number of switches increases, and the number of necessary amplifiers increases, resulting in the increase of cost. Therefore, when one of the plural reception antennas is fixedly used to share the transmission and reception of signals, a reduction in the performance of the radar apparatus can be prevented or decreased, in achieving the decrease of size and weight of the radar apparatus.

INDUSTRIAL APPLICABILITY

As described above, the monopulse radar apparatus according to the present invention is useful as a radar apparatus that detects a distance, a speed, and an azimuth of a mobile object. Particularly, the monopulse radar apparatus is suitable when there is a space constraint in the antenna system or when the mechanism of the antenna system is to be simplified. Further, the antenna switch according to the present invention contributes to decrease size and weight of the radar apparatus.

The invention claimed is:

1. A monopulse radar apparatus comprising:
   a transmitter that generates a transmission signal to detect a target, and outputs generated transmission signal;
   an antenna unit including
      at least one transmission antenna; and
      a plurality of reception antennas;
   a receiver that detects information including azimuth information for the target, based on an output from the antenna unit; and
   an antenna switching unit that switches a connection between the transmitter and the transmission antenna and a connection between the reception antenna and the receiver, wherein
   said antenna unit includes
      a wide-beam array antenna and multiple narrow-beam array antennas having a narrower beam width than said wide-beam array antenna, wherein
      the wide-beam array antenna and the multiple narrow-beam array antennas are respectively constructed from multiple antenna element groups, the multiple antenna element groups being selected in a unit of row or column from an array of antenna elements having at least 6 rows or at least 6 columns so that a distance between the multiple antenna element groups for each of the multiple narrow-beam antennas is larger than a distance between the multiple antenna element groups for the wide-beam antenna, and
   a monopulse process is performed based on an output of the pair of said reception antenna, wherein
      any one of the wide-beam array antenna and the multiple narrow-beam array antennas functions as the transmission antenna or the reception antenna as needed.

2. The monopulse radar apparatus according to claim 1, wherein
   the wide-beam array antenna functions as the transmission antenna.

3. The monopulse radar apparatus according to claim 1, wherein
   the wide-beam array antenna functions as the reception antenna.

4. The monopulse radar apparatus according to claim 1, wherein
   a main-beam direction of each of the pair of array antennas is deviated at least one of a lateral direction and a longitudinal direction from a center direction.

5. The monopulse radar apparatus according to claim 4, wherein
   when a layout surface of the antenna elements of the wide-beam array antenna is a reference layout surface,
   a layout surface of antenna elements of one of the pair of array antennas of which the main-beam direction is deviated at least one of a left direction and an up direction from the center direction is inclined at least one of the left direction and the up direction by the inclination angle from said reference layout surface, and
   a layout surface of antenna elements of other of the pair of array antennas of which the main-beam direction is deviated at least one of a right direction and a down direction from the center direction is inclined at least one of the right direction and the down direction by the inclination angle from said reference layout surface.

6. The monopulse radar apparatus according to claim 5, wherein
   said inclination angle of the one of said array antennas substantially coincides with a deviation angle of the main-beam direction of the one of the array antennas with reference to the main-beam direction of the wide-beam array antenna, and
   said inclination angle of the other of the array antennas substantially coincides with a deviation angle of the main-beam direction of the other of the array antennas with reference to the main-beam direction of the wide-beam array antenna.

7. The monopulse radar apparatus according to claim 4, wherein
   one of said wide-beam array antenna and said pair of array antennas functions as the transmission antenna.

8. The monopulse radar apparatus according to claim 4, wherein
   one of said wide-beam array antenna and said pair of array antennas functions as the transmission antenna, and
   the monopulse process is performed based on outputs of the one and the other of the pair of array antennas.

9. The monopulse radar apparatus according to claim 8, wherein
   an area of a target is specified based on a sign of a phase difference that is monopulse-processed based on the outputs of the at least three sets of the pair of array antennas.

10. The monopulse radar apparatus according to claim 9, wherein
when the area of the target is not specified, the area is specified based on antenna patterns of the at least three sets of the pair of array antennas.

11. The monopulse radar apparatus according to claim 9, wherein
a detection area is divided into a plurality of areas in which a phase distortion does not occur, and
a main-beam direction of the pair of array antennas is deviated with respect to each of divided areas.

12. The monopulse radar apparatus according to claim 11, wherein
when a layout surface of the antenna elements is a reference layout surface, a layout surface of antenna elements of one of the at least three sets of the pair of array antennas of which the main-beam direction is deviated at least one of a left direction and an up direction from the center direction is inclined at least one of the left direction and the up direction by the inclination angle from said reference layout surface, and
a layout surface of antenna elements of other of the at least three sets of the pair of array antennas of which the main-beam direction is deviated at least one of a right direction and a down direction from the center direction is inclined at least one of the right direction and the down direction by the inclination angle from the reference layout surface.

13. The monopulse radar apparatus according to claim 12, wherein
said inclination angle of the one of said array antennas substantially coincides with a deviation angle of the main-beam direction of the one of the array antennas with reference to the main-beam direction of an array antenna that functions as the transmission antenna, and
said inclination angle of the other of the array antennas substantially coincides with a deviation angle of the main-beam direction of the other of the array antennas with reference to the main-beam direction of the array antenna that functions as the transmission antenna.

14. The monopulse radar apparatus according to claim 1, wherein
said narrow-beam array antennas having a pair of array antennas composed of alternately connecting some antenna element groups obtained by connecting a row in a longitudinal direction in a part of the antenna elements.

15. The monopulse radar apparatus according to claim 1, wherein
said antenna switching unit includes
a first amplifier that amplifies a transmission signal from the transmitter, and supplies amplified transmission signal to one antenna;
a second amplifier that amplifies a reception signal of the one antenna;
a plurality of third amplifiers that amplify reception signals of other antennas, respectively; and
a first switch that selects one of an output of the second amplifier and outputs of the third amplifiers, and supplies selected output to the receiver.

16. The monopulse radar apparatus according to claim 15, further comprising:
a second switch that is provided between the output of said first amplifier and the one antenna; and
a third switch that is provided between the one antenna and said second amplifier.

17. The monopulse radar apparatus according to claim 16, wherein
turning on/off of said first amplifier is interlocked with turning on/off of said second switch,
turning on/off of said second amplifier is interlocked with turning on/off of said third switch, and
turning on of either said second amplifier or one of said third amplifiers is interlocked with a selection of said first switch.

18. The monopulse radar apparatus according to claim 15, wherein
said second amplifier and said plurality of third amplifiers can perform a gain adjustment independently, and
gains of reception signals can be adjusted by the gain adjustment.

19. A monopulse radar apparatus comprising:
a transmitter that generates a transmission signal to detect a target, and outputs generated transmission signal;
an antenna unit including
at least one transmission antenna; and
a plurality of reception antennas;
a receiver that detects information including azimuth information for the target, based on an output from the antenna unit; and
an antenna switching unit that switches a connection between the transmitter and the transmission antenna and a connection between the reception antenna and the receiver, wherein
said antenna unit includes
at least three array antennas composed of the antenna elements, and
a monopulse process is performed based on outputs of at least three sets of a pair of array antennas, wherein the at least three array antennas are respectively constructed from multiple antenna element groups, the multiple antenna element groups being selected in a unit of row or column from an array of antenna elements having at least 6 rows or at least 6 columns so that the at least three sets of a pair of array antennas have different distances between antenna element groups thereof.

20. The monopulse radar apparatus according to claim 19, wherein
one of the at least three array antennas functions as the transmission antenna, and
an antenna beam of said array antenna has a wide angle during a signal transmission.

21. The monopulse radar apparatus according to claim 20, wherein
an area of a target is specified based on a sign of a phase difference that is monopulse-processed based on the outputs of the at least three sets of the pair of array antennas.

22. The monopulse radar apparatus according to claim 21, wherein
when the area of the target is not specified, the area is specified based on antenna patterns of the at least three sets of the pair of array antennas.

23. The monopulse radar apparatus according to claim 21, wherein
a detection area is divided into a plurality of areas in which a phase distortion does not occur, and
a main-beam direction of the pair of array antennas is deviated with respect to each of divided areas.

24. The monopulse radar apparatus according to claim 23, wherein
when a layout surface of the antenna elements is a reference layout surface, a layout surface of antenna elements of one of the at least three sets of the pair of array antennas of which the main-beam direction is deviated at least one of a left direction and an up direction from the center direction is inclined at least one of the left direction and the up direction by the inclination angle from said reference layout surface, and
a layout surface of antenna elements of other of the at least three sets of the pair of array antennas of which the main-beam direction is deviated at least one of a right direction and a down direction from the center direction is inclined at least one of the right direction and the down direction by the inclination angle from the reference layout surface.

25. The monopulse radar apparatus according to claim 24, wherein
said inclination angle of the one of said array antennas substantially coincides with a deviation angle of the main-beam direction of the one of the array antennas with reference to the main-beam direction of an array antenna that functions as the transmission antenna, and
said inclination angle of the other of the array antennas substantially coincides with a deviation angle of the main-beam direction of the other of the array antennas with reference to the main-beam direction of the array antenna that functions as the transmission antenna.

26. The monopulse radar apparatus according to claim 19, wherein
said antenna switching unit includes
a first amplifier that amplifies a transmission signal from the transmitter, and supplies amplified transmission signal to one antenna;
a second amplifier that amplifies a reception signal of the one antenna;
a plurality of third amplifiers that amplify reception signals of other antennas, respectively; and
a first switch that selects one of an output of the second amplifier and outputs of the third amplifiers, and supplies selected output to the receiver.

27. The monopulse radar apparatus according to claim 26, further comprising:
a second switch that is provided between the output of said first amplifier and the one antenna; and
a third switch that is provided between the one antenna and said second amplifier.

28. The monopulse radar apparatus according to claim 27, wherein
turning on/off of said first amplifier is interlocked with turning on/off of said second switch,
turning on/off of said second amplifier is interlocked with turning on/off of said third switch, and
turning on of either said second amplifier or one of said third amplifiers is interlocked with a selection of said first switch.

29. The monopulse radar apparatus according to claim 26, wherein
said second amplifier and said plurality of third amplifiers can perform a gain adjustment independently, and
gains of reception signals can be adjusted by the gain adjustment.

30. A monopulse radar apparatus comprising:
a transmitter that generates a transmission signal to detect a target, and outputs generated transmission signal;
an antenna unit including
at least one transmission antenna; and
a plurality of reception antennas;
a receiver that detects information including azimuth information for the target, based on an output from the antenna unit; and
an antenna switching unit that switches a connection between the transmitter and the transmission antenna and a connection between the reception antenna and the receiver, wherein
said antenna unit includes
at least three array antennas,
the azimuth angle of the target is calculated for each phase difference detected based on outputs of at least two sets of a pair of array antennas, and
targets of a same speed and a same distance are selected from calculated azimuth angles, wherein
the at least three array antennas are respectively constructed from multiple antenna element groups, the multiple antenna element groups being selected in a unit of row or column from an array of antenna elements having at least 6 rows or at least 6 columns so that the at least two sets of pair of array antennas have different distances between antenna element groups thereof.

31. The monopulse radar apparatus according to claim 30, wherein
said antenna switching unit includes
a first amplifier that amplifies a transmission signal from the transmitter, and supplies amplified transmission signal to one antenna;
a second amplifier that amplifies a reception signal of the one antenna;
a plurality of third amplifiers that amplify reception signals of other antennas, respectively; and
a first switch that selects one of an output of the second amplifier and outputs of the third amplifiers, and supplies selected output to the receiver.

32. The monopulse radar apparatus according to claim 31, further comprising:
a second switch that is provided between the output of said first amplifier and the one antenna; and
a third switch that is provided between the one antenna and said second amplifier.

33. The monopulse radar apparatus according to claim 32, wherein
turning on/off of said first amplifier is interlocked with turning on/off of said second switch,
turning on/off of said second amplifier is interlocked with turning on/off of said third switch, and
turning on of either said second amplifier or one of said third amplifiers is interlocked with a selection of said first switch.

34. The monopulse radar apparatus according to claim 31, wherein
said second amplifier and said plurality of third amplifiers can perform a gain adjustment independently, and
gains of reception signals can be adjusted by the gain adjustment.

35. An antenna switch that selectively connects a plurality of antennas to either a transmitter or a receiver, the antenna switch comprising:
a first amplifier that amplifies a transmission signal from the transmitter, and supplies amplified transmission signal to one antenna;
a second amplifier that amplifies a reception signal of the one antenna;
a plurality of third amplifiers that amplify reception signals of other antennas, respectively; and
a first switch that selects one of an output of said second amplifier and outputs of said third amplifiers, and supplies selected output to the receiver;
a second switch that is provided between the output of said first amplifier and the one antenna; and a third switch that is provided between the one antenna and said second amplifier, wherein turning on/off of said first amplifier is interlocked with turning on/off of said second switch, turning on/off of said second amplifier is interlocked with turning on/off of said third switch, and turning on/off either said second amplifier or one of said third amplifiers is interlocked with a selection of said first switch.

36. The antenna switch apparatus according to claim 35, wherein said second amplifier and said plurality of third amplifiers can perform a gain adjustment independently, and gains of reception signals can be adjusted by the gain adjustment.

* * * * *

UNITED STATES PATENT AND TRADEMARK OFFICE
CERTIFICATE OF CORRECTION

PATENT NO. : 7,612,706 B2 Page 1 of 1
APPLICATION NO. : 11/630040
DATED : November 3, 2009
INVENTOR(S) : Honda et al.

It is certified that error appears in the above-identified patent and that said Letters Patent is hereby corrected as shown below:

On title page

Please replace:

Item (87) PCT Pub. No.: WO2006/000001

PCT Pub. Date: Jan. 5, 2006

With:

Item (87)  PCT Pub. No.: WO2006/009122

PCT Pub. Date: Jan. 26, 2006

Signed and Sealed this

Sixteenth Day of March, 2010

David J. Kappos
*Director of the United States Patent and Trademark Office*